US012771593B2

(12) United States Patent
Guberman

(10) Patent No.: US 12,771,593 B2
(45) Date of Patent: Oct. 20, 2026

(54) INTELLIGENT TRIAGE

(71) Applicant: Bank of America Corporation, Charlotte, NC (US)

(72) Inventor: Arthur Guberman, Freehold, NJ (US)

(73) Assignee: Bank of America Corporation, Charlotte, NC (US)

( * ) Notice: Subject to any disclaimer, the term of this patent is extended or adjusted under 35 U.S.C. 154(b) by 90 days.

(21) Appl. No.: 19/062,392

(22) Filed: Feb. 25, 2025

(65) Prior Publication Data

US 2026/0254709 A1 Aug. 27, 2026

(51) Int. Cl.

*G06F 15/173* (2006.01)
*H04L 41/0631* (2022.01)
*H04L 43/04* (2022.01)

(52) U.S. Cl.

CPC .......... *H04L 41/0645* (2013.01); *H04L 43/04* (2013.01)

(58) Field of Classification Search

CPC ................. H04L 41/0645; H04L 43/04; H04L 41/0631; H04L 43/08; H04L 41/16; H04L 43/02; H04L 43/16; G06F 11/079; G06F 11/3466; G06F 11/3447; G06F 11/3452

See application file for complete search history.

(56) References Cited

U.S. PATENT DOCUMENTS 9,658,081 B2 5/2017 Vaswani et al.
11,403,157 B1 * 8/2022 Ross ..................... G06F 11/302
11,403,393 B1 8/2022 Satish
11,675,799 B2 * 6/2023 Pierri .................... G06F 11/079 714/37
11,693,727 B2 * 7/2023 Bolagani ............. G06F 11/0724 714/19
11,902,117 B1 2/2024 Guberman et al.
12,399,767 B1 * 8/2025 Breitenbach ........ G06F 11/0709
2004/0093594 A1 5/2004 Kapadia et al.
2009/0018890 A1 1/2009 Werth et al.

(Continued)

OTHER PUBLICATIONS

Lous et al., "Virtual by Design: How a Work Environment can Support Agile Distributed Software Development," 2018, In Proceedings of the 13th International Conference on Global Software Engineering, pp. 97-106 (Year: 2018).

*Primary Examiner* — Suraj M Joshi
*Assistant Examiner* — Hao H Nguyen
(74) *Attorney, Agent, or Firm* — Weiss & Arons LLP

(57) ABSTRACT

Apparatus and methods for virtual monitoring of a set of computing devices, and reducing a mean time to restoral ("MTTR") for the set of computing devices. The methods may include using the WebEx bridge platform to determine a root cause for each report of service outage incident in the computer network. The methods may include, for each outage incident, when at least three of the five different metrics exceed a threshold baseline deviation from the pre-determined baseline measurement, invoking a genAI system to generate a solution to self-heal the root cause with respect to the service outage incident in the computer network. The apparatus and methods may produce a report may include node identifiers corresponding to non-compliant nodes. The report may include node identifiers corresponding to impacted nodes, each impacted node performing as a minimally-compliant node.

20 Claims, 27 Drawing Sheets

(56) References Cited

U.S. PATENT DOCUMENTS

| | | | | |
|---|---|---|---|---|
| 2011/0087510 | A1* | 4/2011 | Putra | G06Q 10/063112 709/204 |
| 2012/0323624 | A1 | 12/2012 | Bernardini et al. | |
| 2016/0196173 | A1* | 7/2016 | Arora | G06F 11/0745 714/37 |
| 2018/0075397 | A1 | 3/2018 | Ronen et al. | |
| 2019/0278646 | A1* | 9/2019 | Fernandez | G06F 11/079 |
| 2020/0065628 | A1* | 2/2020 | Olnick | G06N 3/09 |
| 2020/0186411 | A1 | 6/2020 | Ravichandran et al. | |
| 2020/0192743 | A1* | 6/2020 | Harper | G06F 11/0793 |
| 2021/0011793 | A1* | 1/2021 | Lehmann | G06F 11/0775 |
| 2021/0081265 | A1 | 3/2021 | Mariyappa et al. | |
| 2021/0385143 | A1* | 12/2021 | Chandrasekaran | H04L 41/0631 |
| 2022/0066856 | A1* | 3/2022 | Agarwal | H04L 51/23 |
| 2022/0107858 | A1* | 4/2022 | Jain | G06F 11/0751 |
| 2022/0247678 | A1 | 8/2022 | Atwal et al. | |
| 2022/0311655 | A1* | 9/2022 | Han | G06Q 10/0639 |
| 2022/0334837 | A1 | 10/2022 | Sa et al. | |
| 2022/0358005 | A1* | 11/2022 | Saha | G06F 40/216 |
| 2023/0006901 | A1* | 1/2023 | Chandra | H04L 43/0852 |
| 2023/0091248 | A1 | 3/2023 | Wang et al. | |
| 2023/0333887 | A1 | 10/2023 | White et al. | |
| 2023/0367668 | A1* | 11/2023 | Oglesby | G06F 11/0793 |
| 2023/0368098 | A1* | 11/2023 | Srivastava | G06F 3/0482 |
| 2023/0376372 | A1* | 11/2023 | Chen | G06F 11/0709 |
| 2023/0394389 | A1 | 12/2023 | Jia et al. | |
| 2024/0097971 | A1* | 3/2024 | Harsh | H04L 41/0627 |
| 2024/0220389 | A1* | 7/2024 | Wu | G06F 11/079 |
| 2024/0220908 | A1 | 7/2024 | Winsen et al. | |
| 2024/0427658 | A1* | 12/2024 | Pinahs | G06F 11/079 |
| 2025/0056259 | A1* | 2/2025 | Gonzalez | H04W 8/30 |
| 2025/0080396 | A1* | 3/2025 | Titon | H04L 41/0631 |
| 2025/0165330 | A1* | 5/2025 | Venkatachalam | G06F 11/079 |
| 2025/0225041 | A1* | 7/2025 | O'Neill | G06F 11/3006 |
| 2025/0240651 | A1* | 7/2025 | Andrews | H04W 24/04 |
| 2026/0164362 | A1* | 6/2026 | Gonzalez | H04W 24/10 |

* cited by examiner

| Code | Service Level | Status |
| --- | --- | --- |
| Red | <95% (Non-compliant) | Outage incident |
| Yellow | 96-95% (Minimally compliant) | Watch |
| Green | > 9% (Compliant) | Normal |

| Code | Service Level | Status |
|---|---|---|
| Red | <95% (Non-compliant) | Outage incident |
| Yellow | 96-95% (Minimally compliant) | Watch |
| Green | > 9% (Compliant) | Normal |

INTELLIGENT TRIAGE

FIELD OF THE DISCLOSURE

Aspects of this disclosure relate to monitoring and mitigating Information Technology (IT) incidents. Specifically, the disclosure relates to triaging reported incidents that cause a loss of service and using generative artificial intelligence to propose repair solutions.

BACKGROUND OF THE DISCLOSURE

Internal technology (IT) support teams typically do not have any access into ongoing investigations conducted by other support teams. Nor does software that is dedicated to arranging and forming these IT support team bridges, such as Virtual On-Watch as described in U.S. Pat. No. 11,902,117, filed on Nov. 18, 2022, and entitled, "Virtual On-Watch", which is hereby incorporated by reference herein in its entirety, structure information related to multiple bridges.

It would be desirable to provide systems and methods that structure information related to multiple bridges.

It would be further desirable to provide systems and methods that capture and retrieve, automatically and/or upon command, resources dedicated to ongoing, past and future bridges.

It would be further desirable to provide systems and methods that analyze time and efforts dedicated to ongoing, past and future bridges.

It would be yet further desirable to significantly reduce, following reported incidents that cause a loss of service, mean time to restoral ("MTTR").

SUMMARY OF THE DISCLOSURE

It is an object of the embodiments set forth herein to provide systems and methods that structure information related to multiple bridges.

It is a further object of the embodiments to provide systems and methods that capture and retrieve, automatically and/or upon command, resources dedicated to ongoing, past and future bridges.

It is yet a further object of the embodiments to provide systems and methods that analyze time and efforts dedicated to ongoing, past and future bridges.

It is still a further object of the embodiments to significantly reduce mean time to restoral ("MTTR").

Pursuant to the objects set forth above, an end-to-end triage management process that provides generative artificial intelligence ("genAI") for reducing MTTR is disclosed herein. The method may include receiving, and responding to, one or more reports of a service outage incident in a computer network.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
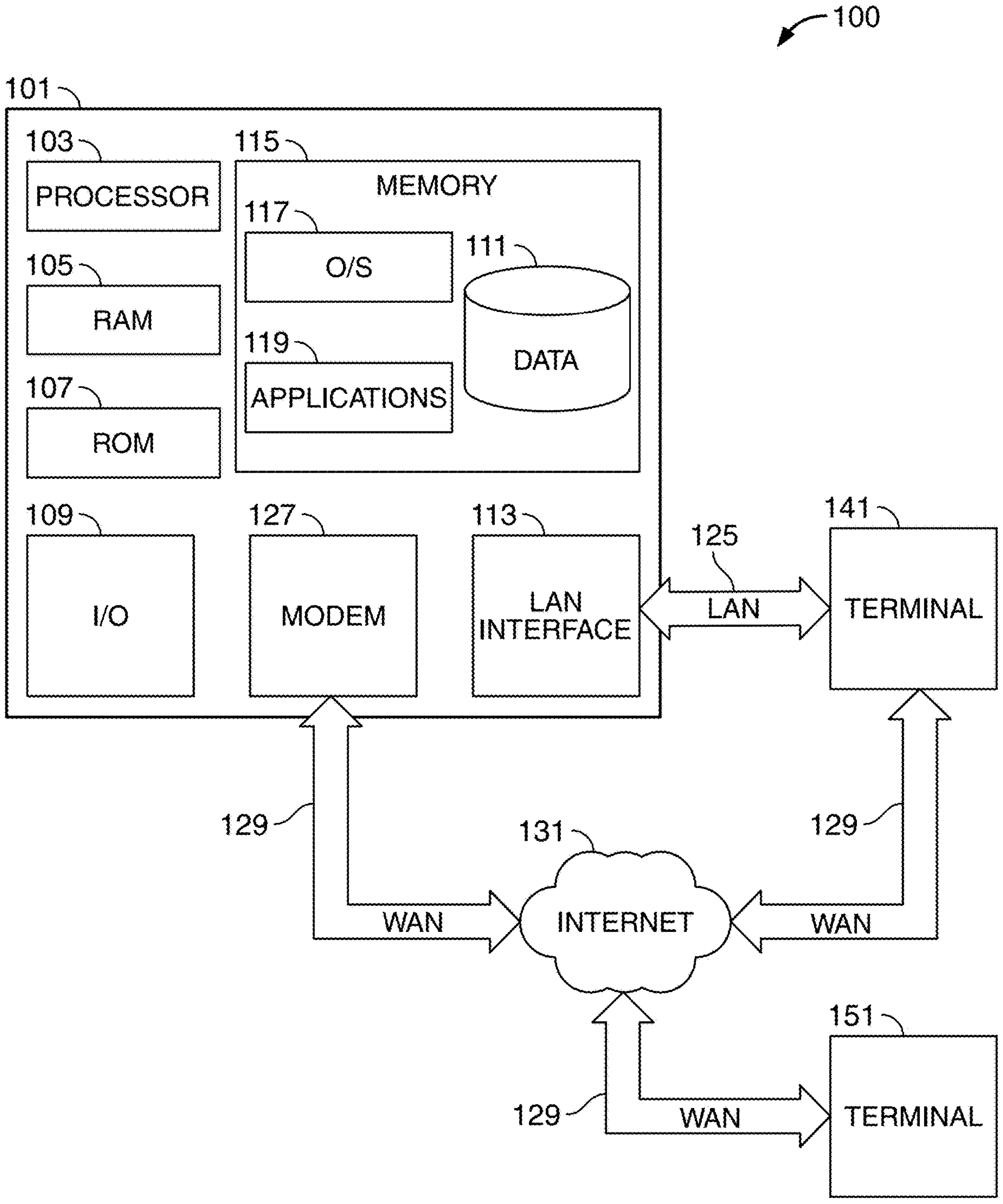
FIG. 1 shows illustrative apparatus in accordance with principles of the disclosure.

Apparatus and methods and media for restoring network service are provided.

A system may perform virtual monitoring of a set of computing devices as follows. The system may include a receiver for receiving a report of a service outage incident in a computer network. The system may include a life-cycle electronic bridge. The electronic bridge may serve as an electronic staging area to respond to the service outage incident. The system may include a transmitter for transmitting an Application Programming Interface (API) call for all bridge information available in the computer network. The system may also include a WebEx bridge platform. The WebEx bridge platform may be operable to receive the API call for bridge information. The bridge information may include all of a plurality of electronic bridges that are currently being hosted by the WebEx bridge platform. The bridge information may include a plurality of responders that are currently involved in at least one of the plurality of electronic bridges.

The processor may be in electronic communication with the WebEx bridge platform. The set of responders should be capable of responding to the incident, should not be listed among the plurality of responders that are currently involved in at least one of the plurality of electronic bridges, and should be electronically listed on the WebEx bridge as available to join the life-cycle electronic bridge.

In some embodiments, the WebEx bridge platform may be further configured to send an electronic prompt to the at least one of the set of responders to join the life-cycle electronic bridge and to add the life-cycle electronic bridge to the plurality of electronic bridges that are currently being hosted by the WebEx bridge platform.

The processor may be further operable to determine a root cause for each report of service outage incident in the computer network. For each root cause, the WebEx bridge platform may be configured to determine an average number of responders for an electronic bridge formed in response to the report of a service outage associated with the root cause. Based on the determination, the WebEx bridge platform may adjust the response to the API call to be in electronic communication to obtain the average number of responders. For each root cause, the life-cycle electronic bridge may be operable to determine an average duration of the life-cycle electronic bridge. Based on the average duration of the life-cycle electronic bridge for each root cause, the life-cycle electronic bridge may determine an expiry time, and then, terminate at the expiry time, the life-cycle bridge.

In some embodiments, an average life-cycle for a bridge event may include a bridge start date/time and a bridge expiry date/time. The WebEx bridge platform may be further operable to determine, between the bridge start date/time and the bridge expiry date/time, peak activity intervals. Such peak activity intervals may be useful in throttling up or down the number of responders active on the bridge.

The WebEx bridge platform may be further operable to determine for each root cause, preferably prior to the arranging of the electronic bridge, whether a legacy electronic bridge exists that relates to each root cause.

When a legacy electronic bridge that relates to a root cause exists, the WebEx bridge platform may be further operable to classify the legacy electronic bridge that relates to the root cause as relational to the root cause, and flag the legacy electronic bridge with a root cause flag. The root cause flag identifies the root cause to which the legacy electronic bridge is directed.

The WebEx bridge platform may be further operable to add the electronic bridge to a set of legacy electronic bridges that all relate to the root cause.

The media may include one or more non-transitory computer-readable media storing computer-executable instructions. The instructions, when executed by a processor on a computer system, may perform a process for virtual monitoring of a set of computing devices, and reduce a mean time to restoral ("MTTR") for the set of computing devices. The process may include receiving, using a receiver, a report of a service outage incident in a computer network. The process may include arranging a life-cycle electronic bridge to serve as an electronic staging area to respond to the service outage incident. The process may include transmitting, using a transmitter, an Application Programming Interface (API) call to a WebEx bridge platform for all bridge information available in the computer network, said bridge information that comprises all of a plurality of electronic bridges that are currently being hosted by the WebEx bridge platform, and a plurality of responders that are currently involved in at least one of the plurality of electronic bridges. The process may include identifying, using the processor in electronic communication with the WebEx bridge platform, a set of responders that are capable of responding to the incident, that are not listed among the plurality of responders that are currently involved in at least one of the plurality of electronic bridges, and that are electronically listed on the WebEx bridge platform as available to join electronic bridge. The process may include using the WebEx bridge platform to send an electronic prompt to the at least one of the set of responders to join the electronic bridge. The process may include adding the life-cycle electronic bridge to the plurality of electronic bridges that are currently being hosted by the WebEx bridge platform. The process may include using the WebEx bridge platform to determine a root cause for each report of service outage incident in the computer network.

The process may include, for each outage incident, using the WebEx bridge platform to obtain at least five different metrics associated with the service outage incident in the computer network. The process may include, for each outage incident, determining, for each of the at least five different metrics associated with the service outage incident in the computer network whether each of the at least five different metrics exceeds a threshold deviation from a pre-determined baseline measurement.

The process may include, for each outage incident, when at least three of the five different metrics exceeds a threshold baseline deviation from the pre-determined baseline measurement, invoking a genAI system to generate a solution to self-heal the root cause with respect to the service outage incident in the computer network. The process may include, for each outage incident, receiving a report confirming success of the generated solution with respect to the service outage incident in the computer network. The process may include, for each outage incident, storing the report in a database for future recall with respect to a future service outage incident in the computer network.

The genAI system may include a database for storing information derived from the electronic bridge.

The genAI system may include a database for storing information derived from a set of legacy electronic bridges.

The report may include node identifiers corresponding to non-compliant nodes.

The report may include node identifiers corresponding to impacted nodes, each impacted node performing as a minimally-compliant node.

At least one of the non-compliant nodes may be defined within a first open systems interconnection ("OSI") layer. At least one of the non-compliant nodes may be defined within a second OSI layer that is different from the first OSI layer.

At least one of the minimally-compliant nodes may be defined within a first OSI layer. At least one of the minimally-compliant nodes may be defined within a second OSI layer that is different from the first OSI layer.

The methods may include, at a WebEx bridge platform, receiving a report of an outage incident, the report including impact metrics corresponding to the incident. The methods may include ascertaining for each metric that the metric exceeds a threshold corresponding to the metric. The methods may include counting how many of the metrics exceed the threshold. The methods may include, in an impact triage process, determining that at least five of the metrics exceed the threshold. The methods may include inputting the report into a genAI root cause model to generate a set of root causes. The methods may include feeding the root causes together with the report into a genAI network repair model to generate a machine-based proposed network repair solution. The methods may include routing the machine-based proposed network repair solution to a WebEx bridge.

The genAI root cause model may include a transformer model. The transformer model may be part of a large language model. The transformer may include an encoder. The transformer may include a decoder.

The genAI network repair model may include a transformer model. The transformer model may be part of a large language model. The transformer may include an encoder. The transformer may include a decoder.

The methods may include, in response to receiving the report, transmitting, using a WebEx call manager, an incident alert to responders.

The incident alert may state that an impact triage process is pending.

The incident alert may state that a machine-based network repair solution is pending.

The report may include node identifiers corresponding to non-compliant nodes.

The report may include node identifiers corresponding to impacted nodes, each impacted node performing at no more than a minimally compliant level.

At least one of the non-compliant nodes may be defined within a first OSI layer. At least one of the non-compliant nodes may be defined within a second OSI layer that is different from the first OSI layer.

At least one of the minimally-compliant nodes may be defined within a first OSI layer. At least one of the minimally-compliant nodes may be defined within a second OSI layer that is different from the first OSI layer.

The first OSI layer may be an application layer. The second OSI layer may be a network layer.

The non-compliant nodes and the minimally-compliant nodes may be linked to a network analytics engine that monitors for each node a performance metric.

The performance metric may be a metric selected from the group consisting of number of online banking sessions, number of online customers, number of customer touches per hour, number of retail centers, numbers of enterprise business employees, and number of enterprise customer-facing employees.

The non-compliant nodes and the minimally-compliant nodes may be linked to a geographic information system ("GIS") that is configured to calculate for each node a geographic metric. The geographic metric may be selected from the group consisting of number of automated transaction machines ("ATM"), number of retail centers, and size of geographic region.

Nodes of the first OSI layer may be mapped to the GIS. Nodes of the second OSI layer may be mapped to the GIS. Enterprise assets may be mapped to the GIS. The assets may include human resources, real estate, structures, satellites, vehicles, communication equipment, factories, natural resources and any other suitable assets.

The methods may include, prior to the reporting, training the genAI root cause engine to predict a root cause for an outage by providing historical outage information to the genAI root cause engine, information including, for each of a plurality of outage incidents: an outage synopsis; a topological application layer performance map; a topological network layer performance map; and impact metrics. One or more of the outage synopsis, the application layer performance map, the network layer performance map, and the impact metrics may be included in an outage file corresponding to the outage. The root cause may be identified in the outage file.

The apparatus may include a system for restoring service in a communication network. The system may include a WebEx call manager that is configured to receive a report of a service outage incident in a computer network. The system may include a WebEx conference bridge server that is hosted by a WebEx conference bridge platform. The WebEx bridge server may be is configured to arrange a life-cycle electronic bridge to serve as an electronic staging area to respond to the service outage incident. The WebEx bridge server may be configured to collect all bridge information available regarding the computer network, said bridge information that comprises all of a plurality of electronic bridges that are currently being hosted by the WebEx bridge platform, and a plurality of responders that are currently involved in at least one of the plurality of electronic bridges. The bridge server may be configured to establish, support, facilitate, monitor, terminate, track bridge conferences and participant data.

The system may include an outage management engine in electronic communication with the WebEx bridge platform that is configured to identify a set of responders that are capable of responding to the incident, that are not listed among the plurality of responders that are currently involved in at least one of the plurality of electronic bridges, and that are electronically listed on the WebEx conference bridge server as available to join electronic bridge.

The WebEx bridge server may be configured to send an electronic prompt to the at least one of the set of responders to join the electronic bridge. The WebEx bridge server may be configured to add the life-cycle electronic bridge to the plurality of electronic bridges that are currently being hosted by the WebEx bridge platform.

The outage management engine may be configured to determine a root cause for each report of service outage incident in the computer network. The outage management engine may be configured to, for each service outage incident, identify at least five different metrics associated with the service outage incident in the computer network. The outage management engine may be configured to, for each service outage incident, determine, for each of the at least five different metrics associated with the service outage incident in the computer network whether each of the at least five different metrics exceeds a threshold deviation from a pre-determined baseline measurement.

The outage management engine may be configured to, for each service outage incident, when at least three of the five different metrics exceeds a threshold baseline deviation from the pre-determined baseline measurement, invoke a genAI system to generate a solution to self-heal the root cause with respect to the service outage incident in the computer network. The outage management engine may be configured to, for each service outage incident, transmit to the responders a report confirming success of the generated solution with respect to the service outage incident in the network. The outage management engine may be configured to, for each service outage incident, store the report in an outage incident database for future recall with respect to a future service outage incident in the network.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods. Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Some of the FIGS. shows steps of illustrative processes. Some or all of the steps may be performed by apparatus shown and described herein. The steps will be described as being performed by "the system," which may include apparatus, methods and instructions shown and described herein, or by any other suitable system.

FIG. 1 shows an illustrative block diagram of system 100 that includes computer 101. Computer 101 may alternatively be referred to herein as an "engine," "server," or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may include processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. Processor 103 may also execute all software running on the computer. Other components commonly used for computers, such as EEPROM or flash memory or any other suitable components, may also be part of computer 101.

Memory 115 may include any suitable permanent storage technology, such as a hard drive. Memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 may connect to LAN 125 through LAN interface 113 or an adapter. When used in a WAN networking environment, computer 101 may include modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions or data, perform processes disclosed herein, or other suitable tasks.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
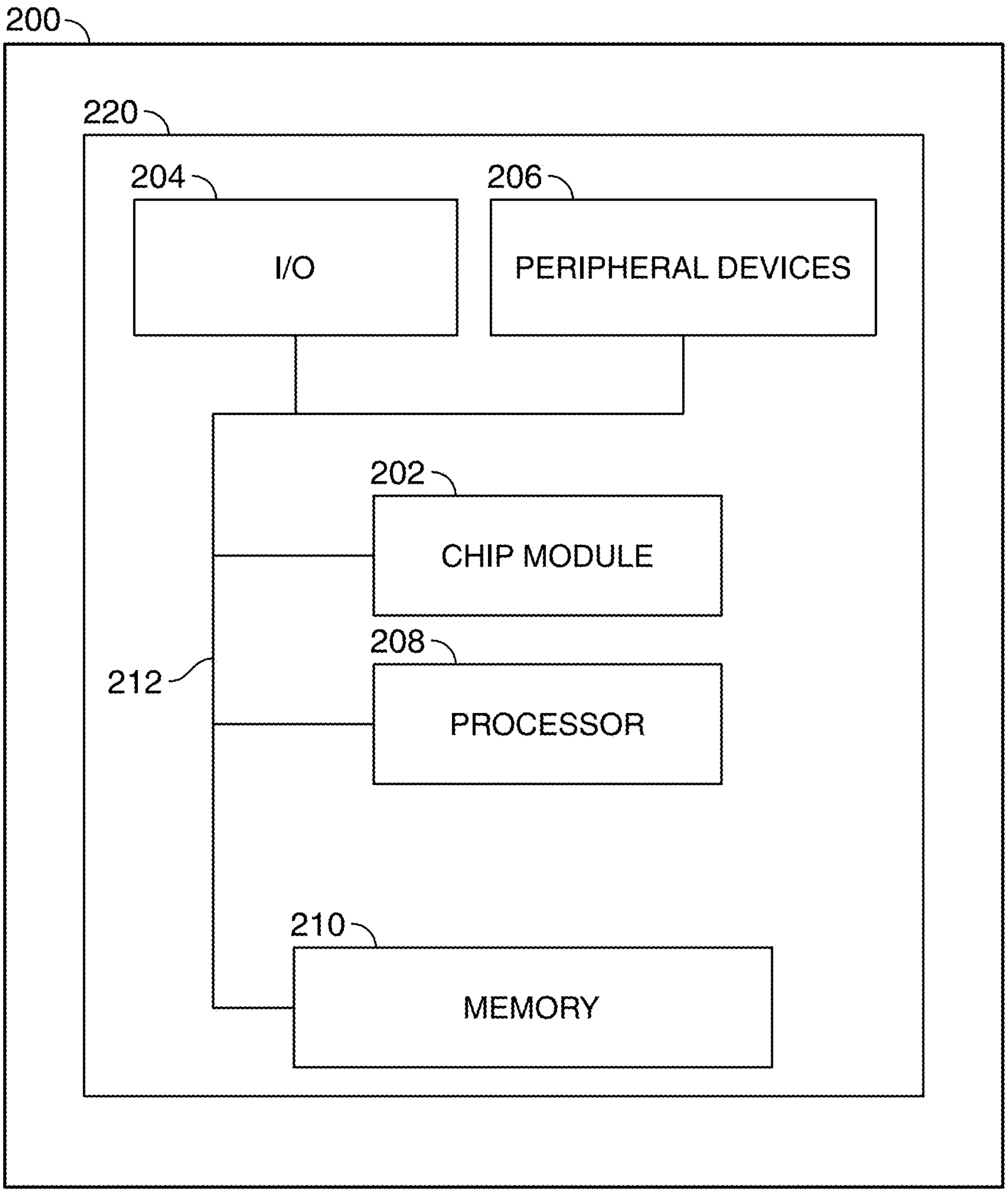
FIG. 2 shows illustrative apparatus in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208, and 210 may be coupled together by a system bus or other interconnections 212 and may be present on one or more circuit boards such as circuit board 220. In some embodiments, the components may be integrated into a single chip. The chip may be silicon-based.

Figure 3:
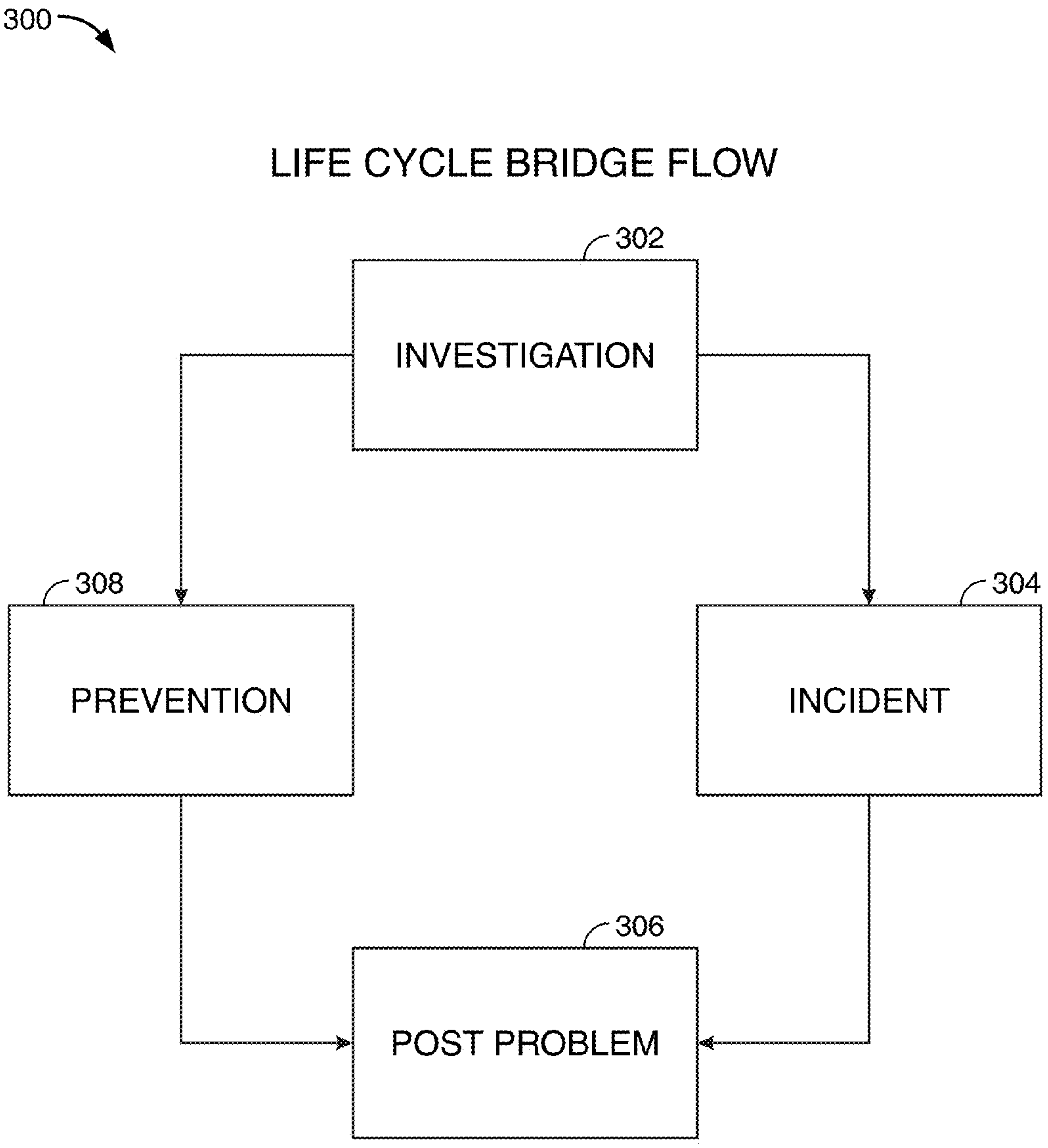
FIG. 3 shows an illustrative flow diagram in accordance with the principles of the disclosure.

FIG. 3 shows an illustrative flow diagram of a life cycle bridge flow in accordance with the principles of the disclosure. At the beginning of the life-cycle, an investigation 302 of an incident is initiated. Investigation 302 may lead to one or more outcomes.

Investigation 302 may lead to creating a bridge to deal with an incident 306.

Investigation 302 may lead to taking steps to prevent further incidents, as shown at prevention 304.

Either prevention step 304 or incident 306 or both prevention step 304 and incident 306 may lead to a post-problem analysis as shown at 308. Post-problem analysis 308 may utilize AI analysis to make corrections to future investigation, and responses based thereon or tuned thereto, in order to implement corrective, possibly self-healing, measures to avoid future incidents.

Figure 4:
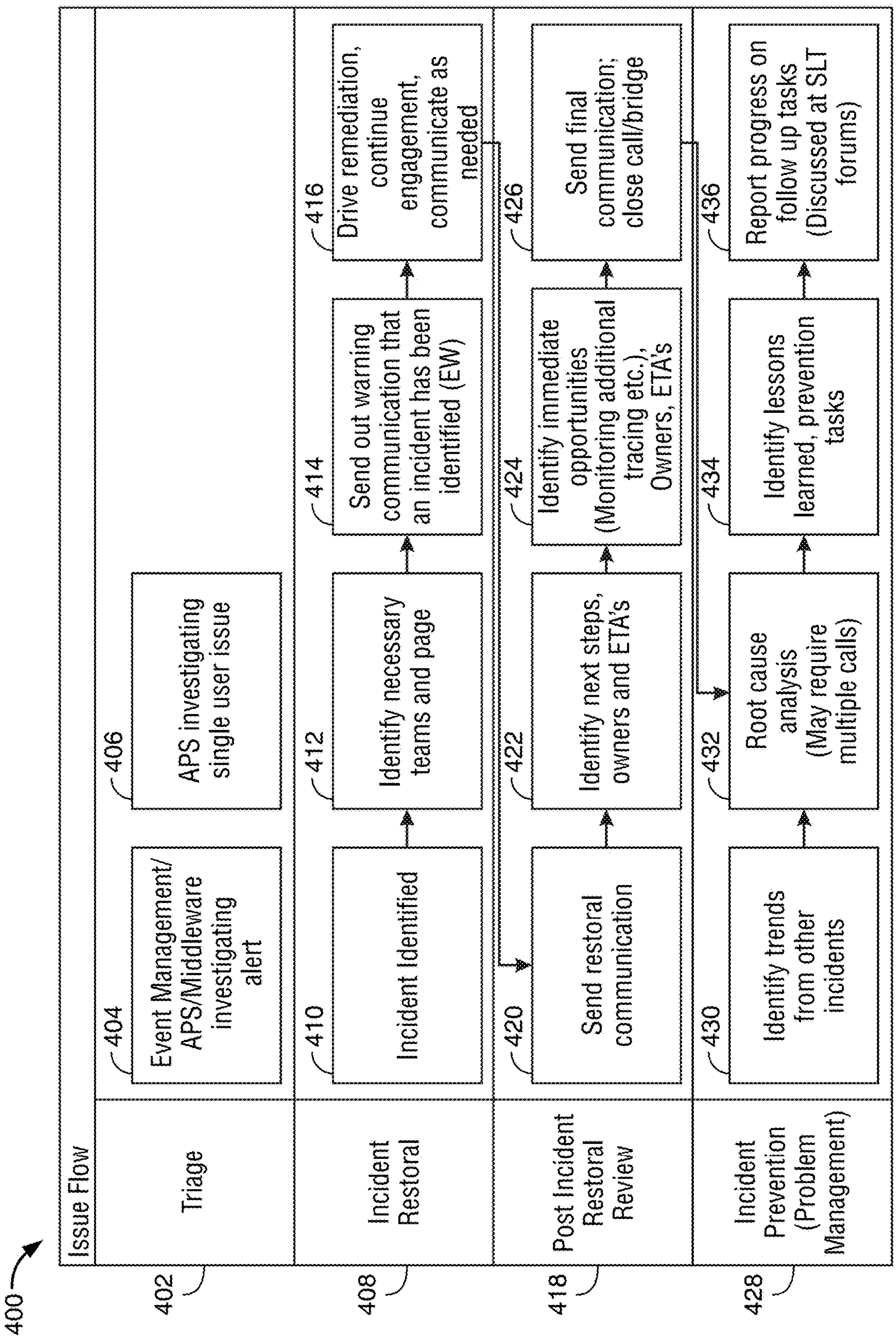
FIG. 4 shows another illustrative flow diagram in accordance with the principles of the disclosure.

FIG. 4 shows an illustrative flow diagram of issue flow 400 in a life cycle bridge in accordance with the principles of the disclosure. Swim lanes 402, 408, 418, and 428 are shown in issue flow 400. Specifically, issue flow includes triage lane 402, incident restoral lane 408, post incident restoral review lane 418 and incident prevention (problem management) lane 428.

Triage lane 402 includes an entry for event management/Application Production Services "APS"/middleware investigating alert 404. Triage lane 402 also includes an entry involving an APS dedicated to investigating a single-user issue 406.

Incident restoral lane 408 includes incident identification 410, identification of necessary teams and pages 412, and one or more relevant responders release of a warning communication 414 that an incident has been identified. Finally, incident restoral lane 408 shows driving remediation, continuing engagement and communicating as needed 416.

At this point, post incident restoral review lane 418 is invoked. Post-incident restoral review 418, which continues from driving remediation, etc., shows sending restored communication 420 followed by (or substantially simultaneously thereto) identifying next steps, owners of incidents, and estimated times of arrival (ETAs) for follow-up communications 422.

Thereafter, post incident restoral review 418 may include identifying immediate opportunities (monitoring, additional tracking, etc.) owners of same and ETAs for same 424.

Finally, post incident restoral review 418 may include sending a final communication, and closing the call or bridge 426.

A swim lane dedicated to incident prevention (problem management) 428 may follow post-incident restoral review 418. Incident prevention 428 may include root cause analysis. Root cause analysis may receive input from the final communication close call. Root cause analysis may retrieve trends as identified as desired from other incidents 430. Root cause analysis may require multiple calls to fully obtain information for the root cause 432.

It should be noted that, in some embodiments, the final communication and/or closing the call or bridge 426 may be timed to coincide with the average time of expiry for a call or bridge associated with the same root cause as the current event.

Root cause analysis may further identify trends and lessons learned as well as tasks for prevention of future outage incidents 434. Root cause analysis may also provide a progress report reflective of follow-up tracks discussed at SLT forums 436 (Senior Leadership Team), a venue to discuss various topics with management team.

Figure 5:
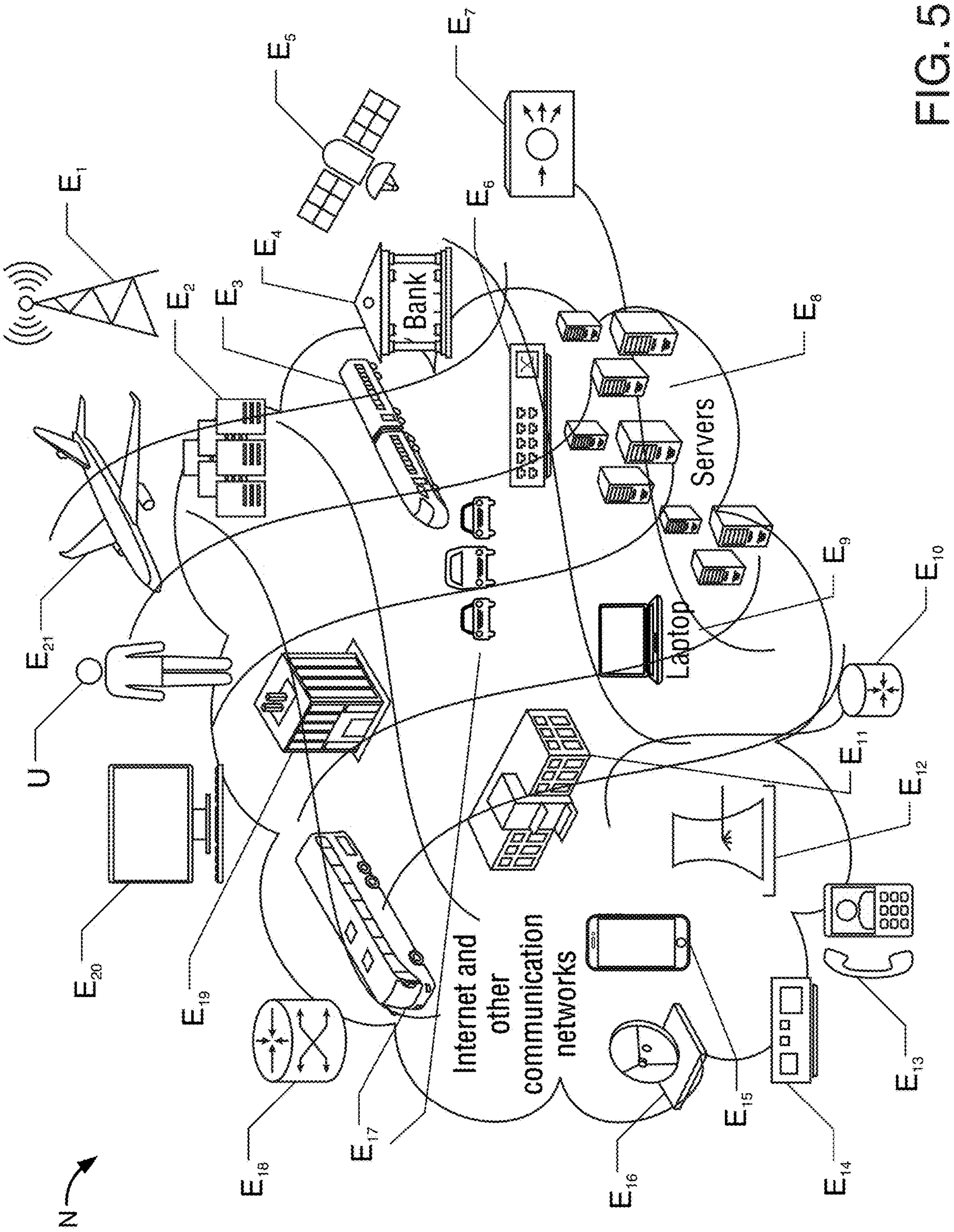
FIG. 5 shows illustrative apparatus in accordance with the principles of the invention along with an illustrative network that may be treated in accordance with the principles of the invention.

FIG. 5 shows an illustrative network N, which may be treated by the apparatus, methods and media. Network N may include two or more elements Ej. Each element Ei may include one or more nodes. Table 1 lists illustrative elements.

TABLE 1

Illustrative elements.
Illustrative elements $E_i$.

| i | Element type |
|---|---|
| 1 | Antenna |
| 2 | Cloud server cluster |
| 3 | Transportation infrastructure, mass transit: Rail vehicle |
| 4 | Public or private financial institution |
| 5 | Satellite |
| 6 | Switch |
| 7 | Load balancer |
| 8 | Servers |
| 9 | Personal computer/laptop/mobile communication device |
| 10 | Router |
| 11 | Academic/private/government institution |
| 12 | Energy infrastructure installation |
| 13 | Video phone |
| 14 | Bridge |
| 15 | Mobile/cellular communication device |
| 16 | Antenna/microwave link |

TABLE 1-continued

| Illustrative elements. Illustrative elements $E_i$. | |
|---|---|
| i | Element type |
| 17 | Transportation infrastructure, mass transit, private and individual transportation: Wheeled vehicle |
| 18 | Automated transaction machine ("ATM") router |
| 19 | Private or government office building |
| 20 | Personal computing device |
| 21 | Transportation infrastructure, mass transit: Aircraft |

Network N may include any other suitable elements.

A user such as U may be associated with or operate one or more of elements Ej. User U may be an enterprise customer. User U may be a corporate or institutional entity.

Network N may include one or more backbones that link WANs, LANs, public telephone service networks or other suitable networks.

Figure 6:
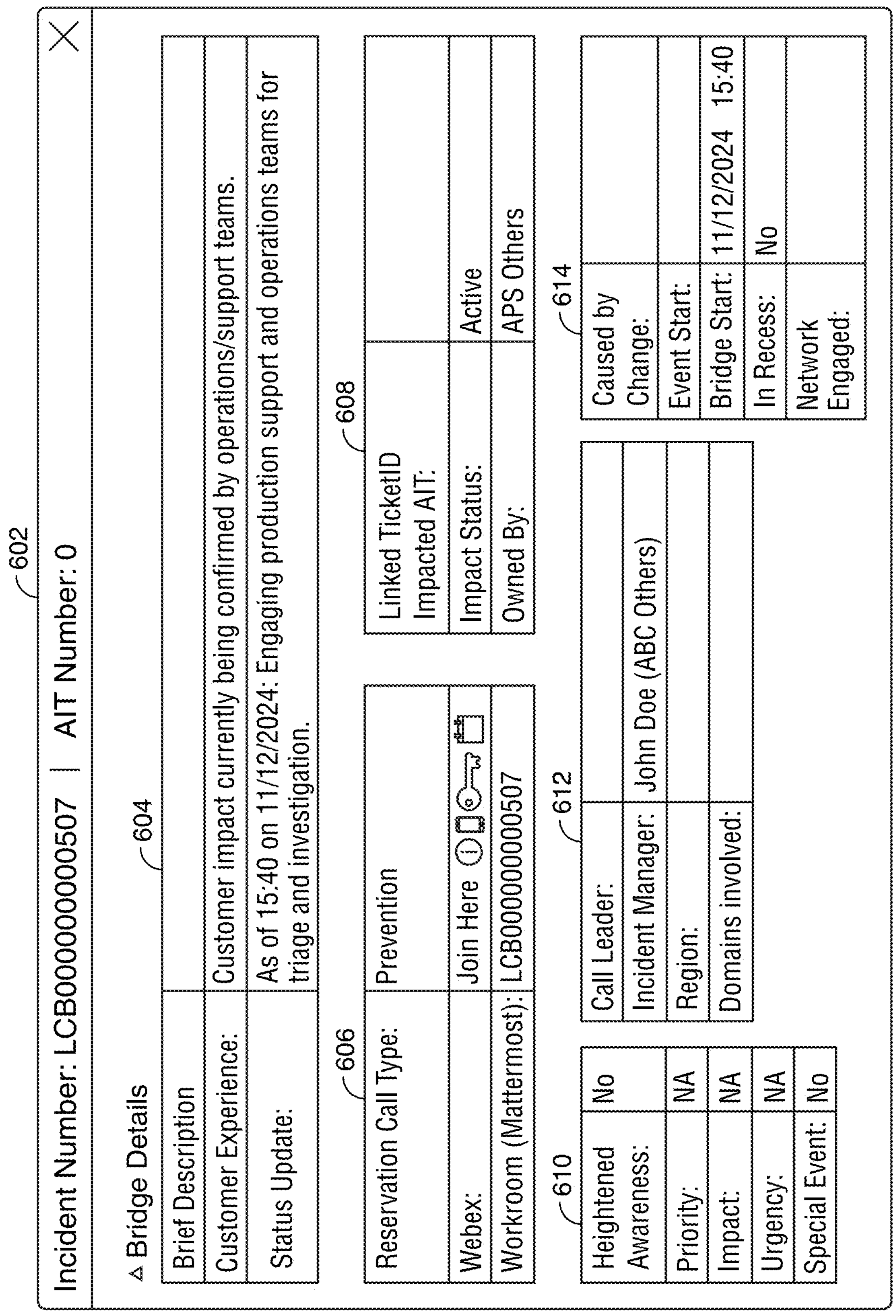
FIG. 6 shows another illustrative bridge detail report in accordance with the principles of the disclosure.

FIG. 6 shows illustrative bridge detail report 602 in accordance with the principles of the disclosure. Illustrative bridge detail report 602 may include a bridge details section 604, reservation information 606, ticket information 608, criticality information 610, personnel information 612 and bridge facts 614.

Items listed on illustrative bridge detail report 602 are set forth in Table 2.

TABLE 2

| Items listed on illustrative bridge detail report 602. Illustrative items listed on illustrative bridge detail report 602 |
|---|
| Brief Description |
| Customer Experience |
| Status Update |
| Reservation Call Type |
| Webex |
| Workroom/Matter Most |
| Heightened Awareness |
| Priority |
| Impact |
| Urgency |
| Special Event |
| Call Leader |
| Incident Manager |
| Region |
| Domains Involved |
| Linked Ticket ID |
| Impacted AIT |
| Impact Status |
| Owned By |
| Caused by Charge |
| Event Status |
| Bridge Start |
| In Recess |
| Network Engaged |

Figure 7:
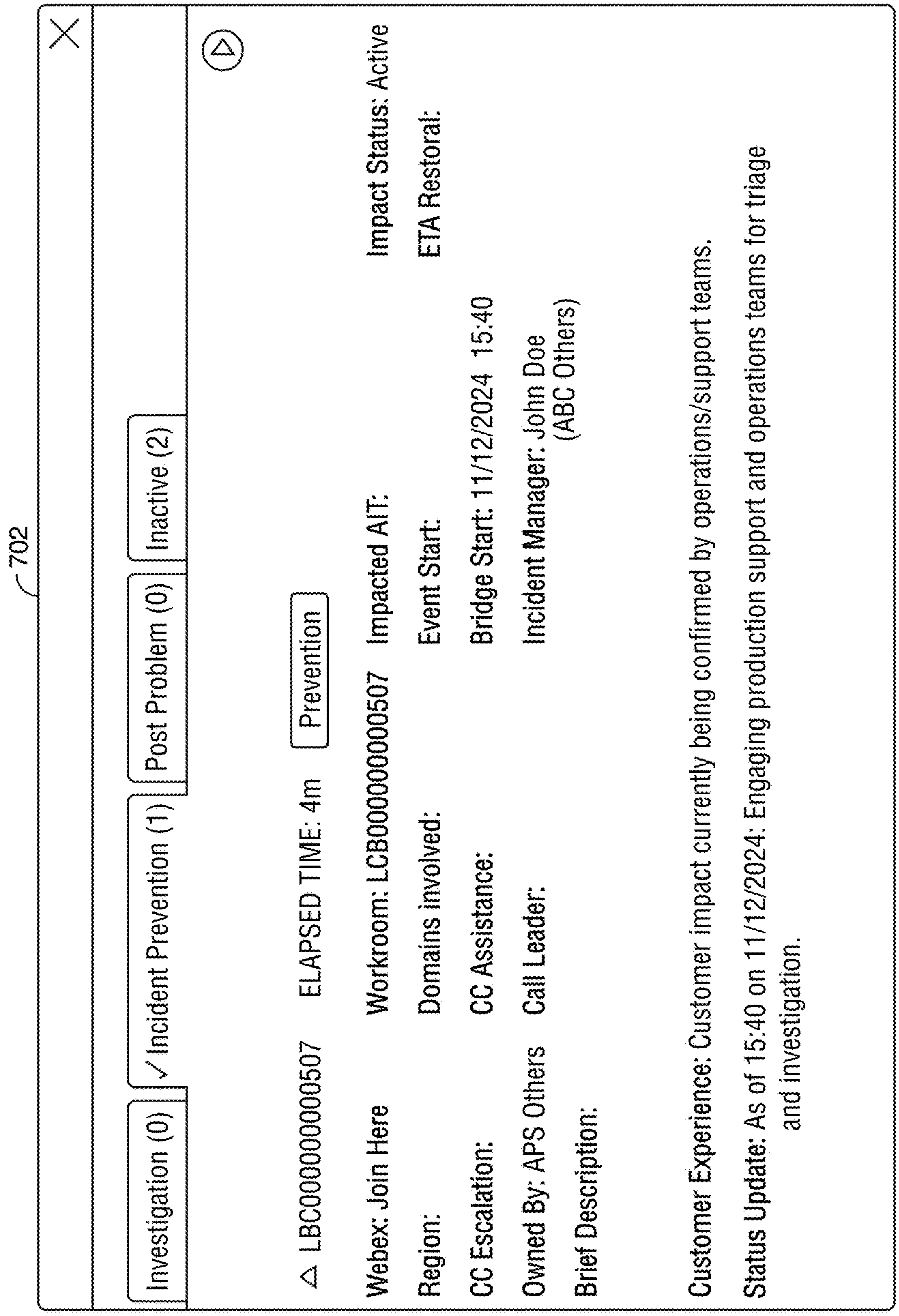
FIG. 7 shows an illustrative bridge screen in accordance with the principles of the disclosure.

FIG. 7 shows an illustrative bridge screen 702 in accordance with the principles of the disclosure. Specifically, illustrative bridge screen 702 may preferably be directed to incident prevention.

Items included in illustrative bridge screen 702 are set forth in Table 3.

TABLE 3

| Items included in illustrative bridge screen 702. Illustrative item |
|---|
| Investigation |
| Incident Prevention |
| Post Problem |
| Inactive |
| Webex |
| Region |
| Escalation |
| Owned By |
| Brief Description |
| Customer Experience |
| Status Update |
| Workroom |
| Domain Involved |
| Assistance |
| Call Leader |
| Illustrative item |
| Impacted AIT |
| Event Start |
| Bridge Start |
| Incident Manager |
| Impact Status |
| ETA Restored |

Figure 8:
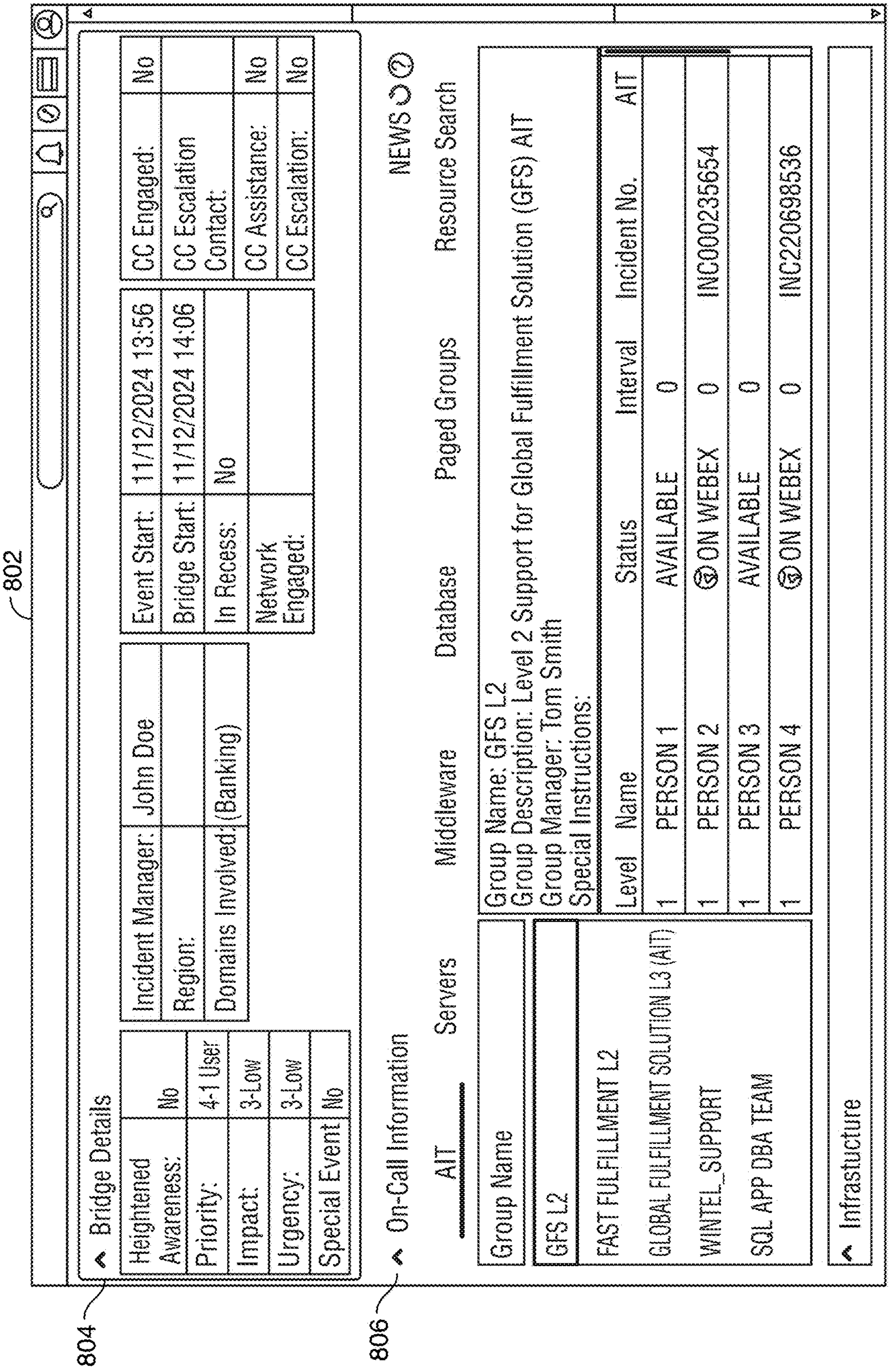
FIG. 8 shows an illustrative group information screen.

FIG. 8 shows an illustrative group information screen 802.

More specifically, FIG. 8 shows group information screen 802 including a group descriptor GUI. At 804, bridge details are displayed. At 806, responders for on-call information are displayed.

Items included in FIG. 8 are set forth in Table 4 below:

TABLE 4

| Items included in FIG. 8. Illustrative item |
|---|
| Group Name |
| Group Description |
| Group Manager |
| Special Instructions |
| Level of Team Member |
| Name of Team Member |
| Status of Team Member |

Figure 9:
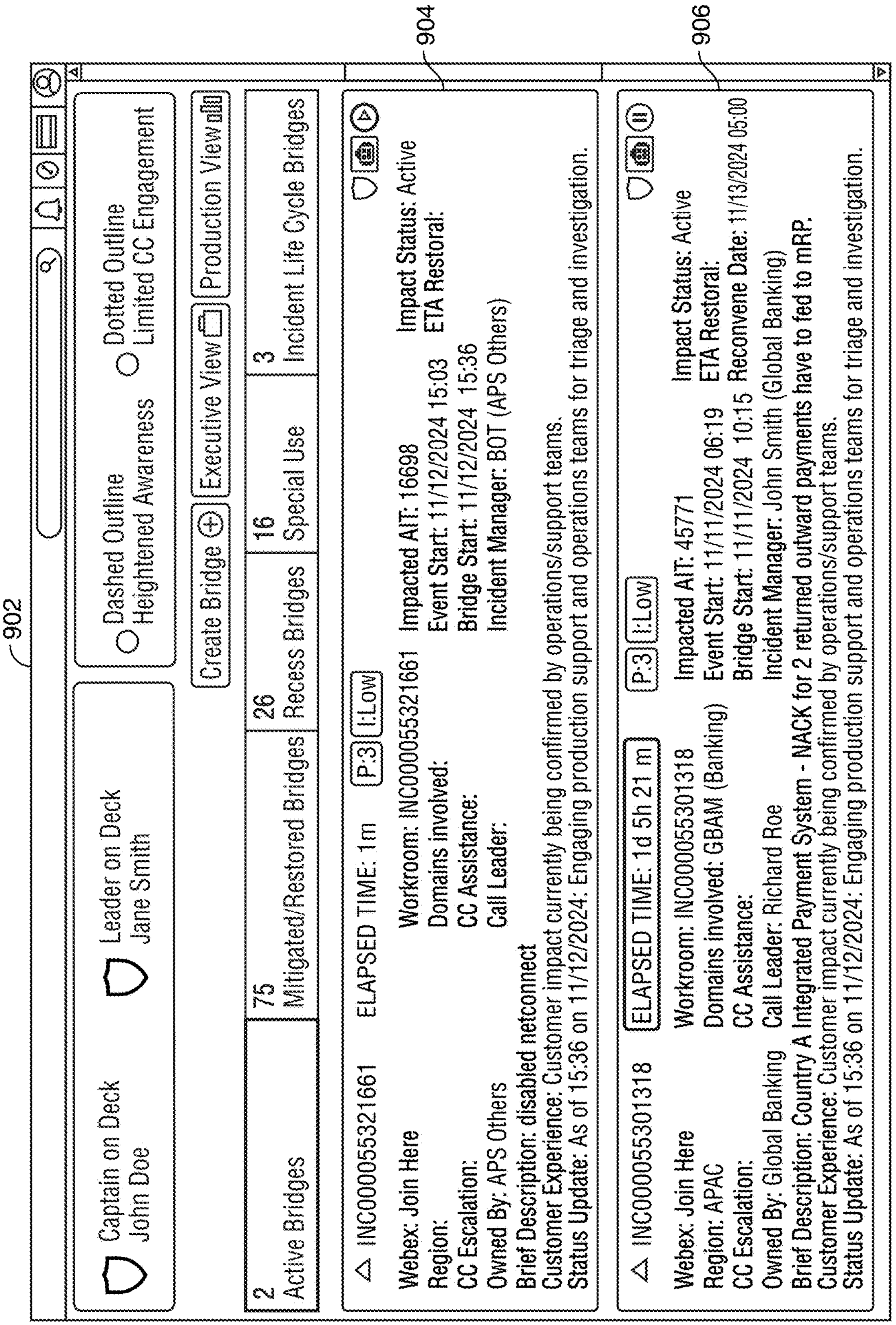
FIG. 9 shows an illustrative bridge screen in accordance with the principles of the disclosure.

FIG. 9 shows an illustrative aggregate bridge screen 902 in accordance with the principles of the disclosure. Illustrative aggregate bridge screen 902 shows multiple bridge screens 904, 906 preferably stacked one on top of the other in a vertical arrangement. Other arrangements of groups of bridge screens 904, 906 are also contemplated as part of this disclosure. Such arrangements may be either system-set, or user-defined, at least in order to customize the display to a user preference.

In certain embodiments, a number and/or level of responders requested by an electronic bridge according to the disclosure may depend on the criticality, public-facing nature and/or the size of the outage—e.g., the percentage amount of the network affected or the number of devices affected. In certain embodiments, the number and/or level of responders may vary proportionally with the size of the outage.

In certain embodiments, a number and/or level of responders requested by an electronic bridge according to the disclosure may depend on the criticality, public-facing nature and/or the number of systems affected by the outage—e.g., software systems, hardware systems, hybrid software/hardware systems, customer-facing systems, non-customer facing systems, etc. In certain embodiments, the number and/or level of responders may vary proportionally with the number of systems affected by the outage.

As described above, certain embodiments may involve the selection of respondents along a two-dimensional array of responders. In such embodiments, both the level of the respondents, with respect to each of the respondents' level of technical acuity or other suitable characteristic, may form one dimension of the array, while the total number of selected respondents may form another dimension of the array. Thus, a request for respondents may vary along two dimensions. In some embodiments of the disclosure, more than two dimensions may be relevant to selection of respondents, and is, in fact, within the scope of the disclosure.

Figure 10:
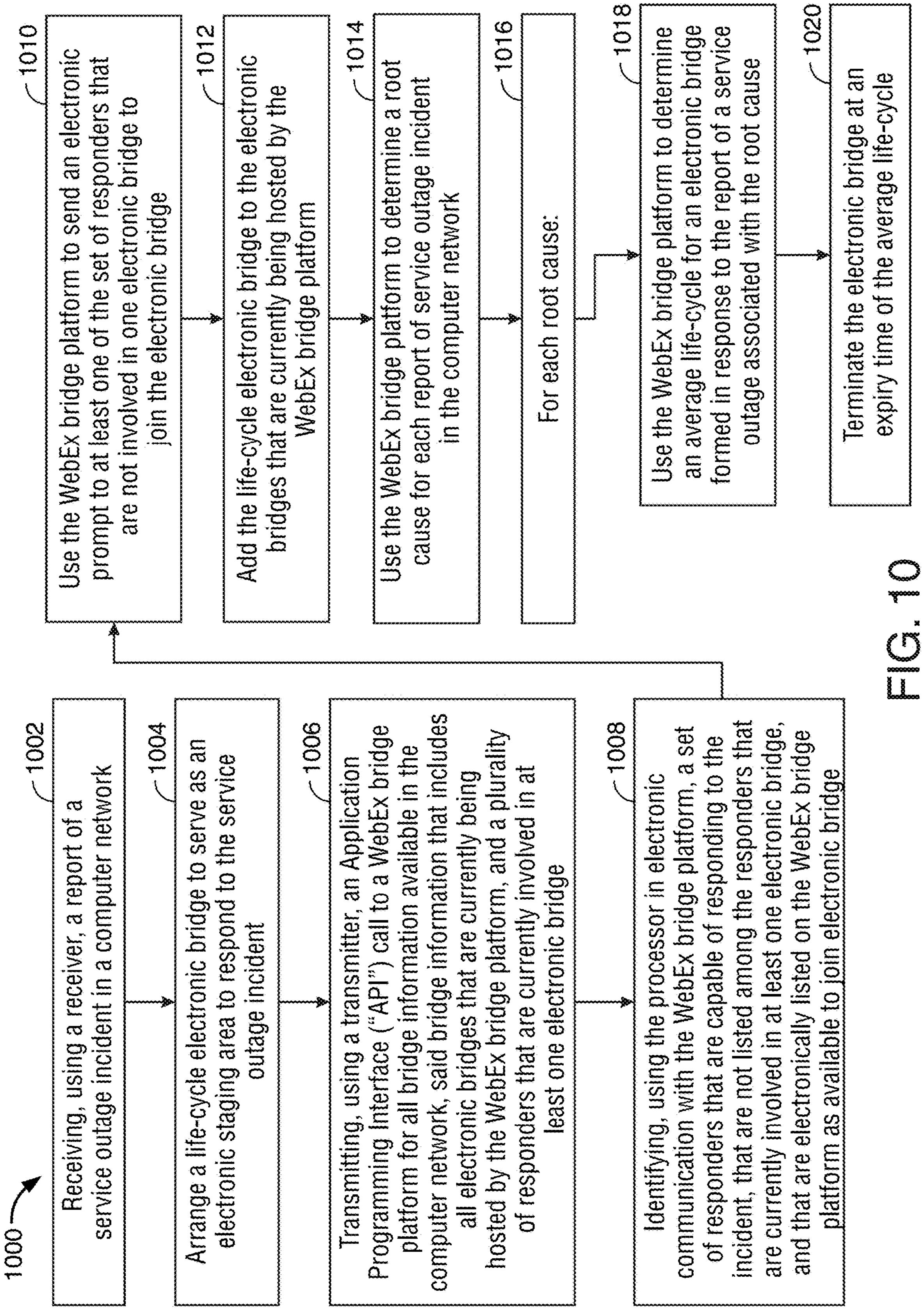
FIG. 10 shows illustrative flow diagrams according to the principles of the disclosure.

FIG. 10 shows an illustrative flow diagram according to the principles of the disclosure. At 1002, a step of receiving a report of a service outage incident in a computer network is shown. At 1004, the method arranges a life-cycle electronic bridge to serve as an electronic staging area to respond to the service outage incident is shown.

At 1006, the method shows transmitting an API call to a WebEx bridge platform for all bridge information available in the computer network. The bridge information may include all of a plurality of electronic bridges that are currently being hosted by the WebEx bridge platform. The bridge information may further identify a plurality of responders that are currently involved in at least one of the plurality of electronic bridges.

Step 1008 may identify, using the processor in electronic communication with the WebEx bridge platform, a set of responders that are capable and available for responding to the incident, that are not listed among the plurality of responders that are currently involved in at least one of the plurality of electronic bridges, and that are electronically listed on the WebEx bridge platform.

Step 1010 involves using the WebEx bridge platform to send an electronic prompt to at least one of the set of responders to join the electronic bridge.

At step 1012, the method adds the life-cycle electronic bridge to the plurality of electronic bridges that are currently being hosted by the WebEx bridge platform.

At 1014, the WebEx bridge platform may be used to determine a root cause for each report of service outage incident in the computer network. Then, for each root cause (see 1016), the WebEx bridge platform may be used to determine an average life-cycle for an electronic bridge formed in response to the report of a service outage associated with the root cause, as shown at 1018. Finally, the method may terminate the electronic bridge at an expiry time corresponding to the average life-cycle, as shown at 1020. Table 4 lists illustrative root causes.

TABLE 4

| Illustrative root causes. Illustrative root causes |
|---|
| VPN connection unreliable |
| Unreliable connectivity |
| Internet throughput deficiency |
| Software updates |
| Security flags |
| DNS resolution failure or inaccuracy |
| Data packet loss |
| Erroneous configuration |
| Hardware failures |
| Power outage |
| Other suitable root causes |

Figure 11:
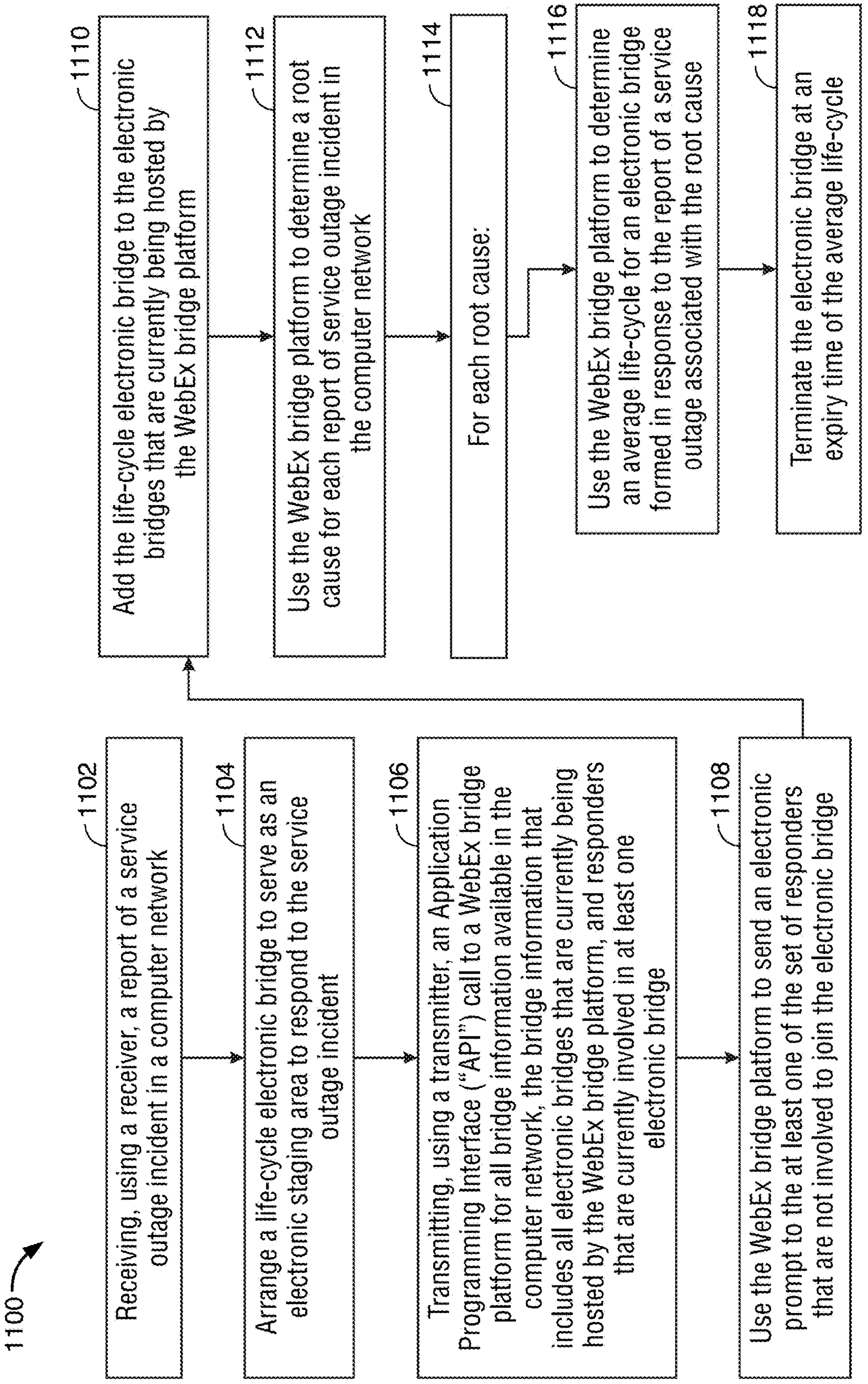
FIG. 11 shows other illustrative flow diagrams according to the principles of the disclosure.

FIG. 11 shows another illustrative flow diagram according to the principles of the disclosure. At 1102, the diagram shows a first part of a method, describing receiving a report of a service outage incident in a computer network. At 1104, the method shows arranging an LCB to serve as an electronic staging area to respond to the service outage incident.

The method then, at step 1106, transmits an API call to a WebEx bridge platform for all bridge information available in the computer network. The bridge information may include electronic bridges that are currently being hosted by the WebEx bridge platform as well as responders that are currently involved in at least one electronic bridge.

At 1108, the WebEx bridge platform may be used to send an electronic prompt to the responders that are not involved in an electronic bridge to join the electronic bridge.

At 1110, the LCB may be added to the electronic bridges that are currently being hosted by the WebEx platform.

Thereafter, the WebEx platform may determine a root cause for each report of service outage incident in the computer network, as shown at 1112.

At 1114-1116, the root cause determination may be used by the WebEx platform to determine an average life-cycle for an electronic bridge formed in response to the report of a service outage associated with the root cause, and 1118 shows terminating the electronic bridge at an expiry time of the average-life cycle, preferable independently of activity on the bridge. It should be noted that, to the extent that activity on the bridge exceeds a pre-determined threshold termination may be overridden, or responders may be prompted to restart the bridge and/or reset the bridge to a previous level of operation.

Figure 12:
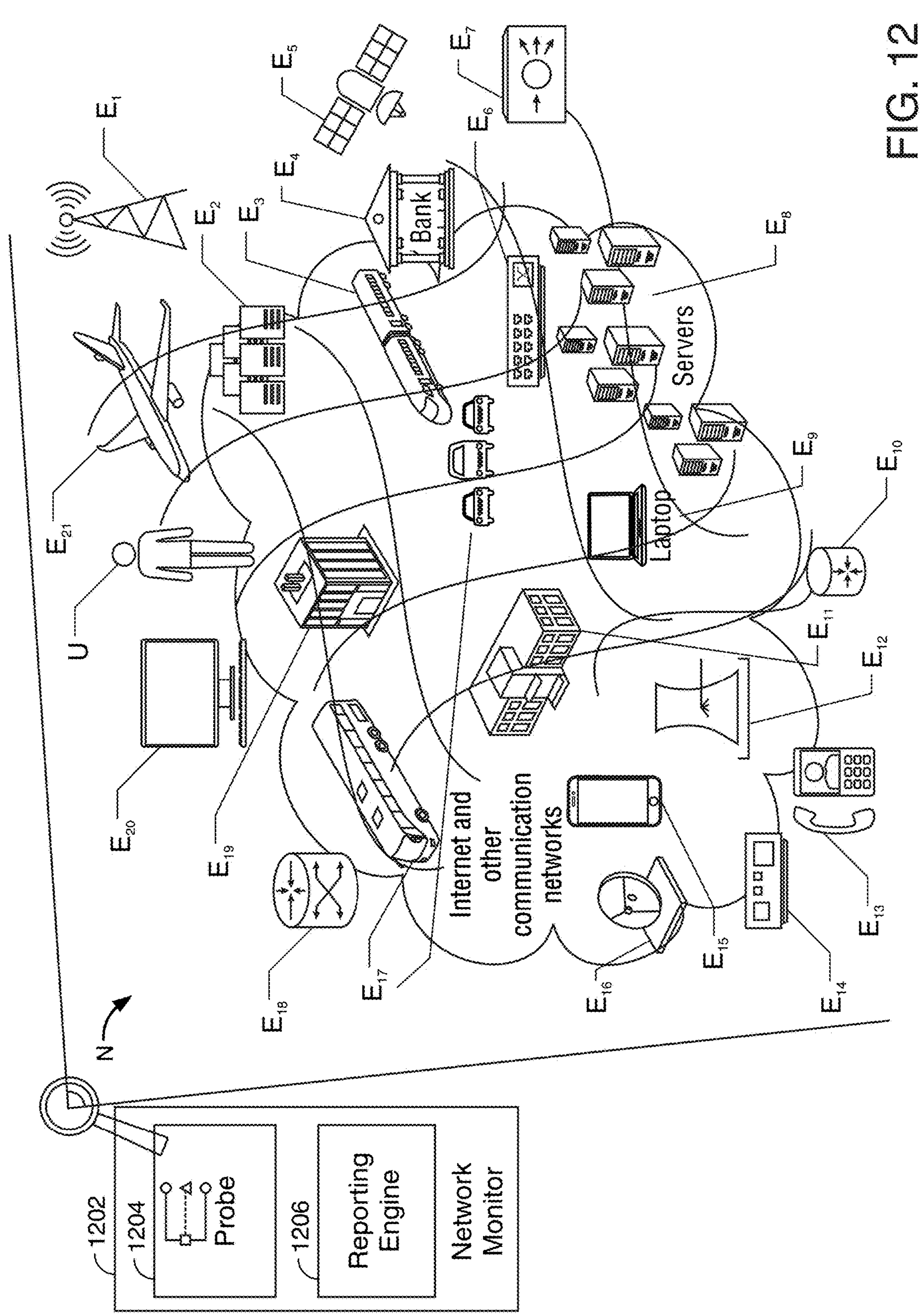
FIG. 12 shows illustrative apparatus, along with other apparatus and users, in accordance with the principles of the invention.

FIG. 12 shows network N along with network monitor 1202. Network monitor 1202 may include probe 1204. Network monitor 1202 may include reporting engine 1206.

Probe 1204 may be configured to passively (e.g., "ping") or actively (e.g., via API calls or other code) query one or more of elements Ej or the nodes associated with elements Ej. Probe 1204 may be configured to formulate a topological map of network N. The topological map may correspond to an application layer, a network layer, a physical layer or any other suitable layer of network N. Probe 1204 may provide to reporting engine 1206 one or more performance levels for each node.

Figure 13:
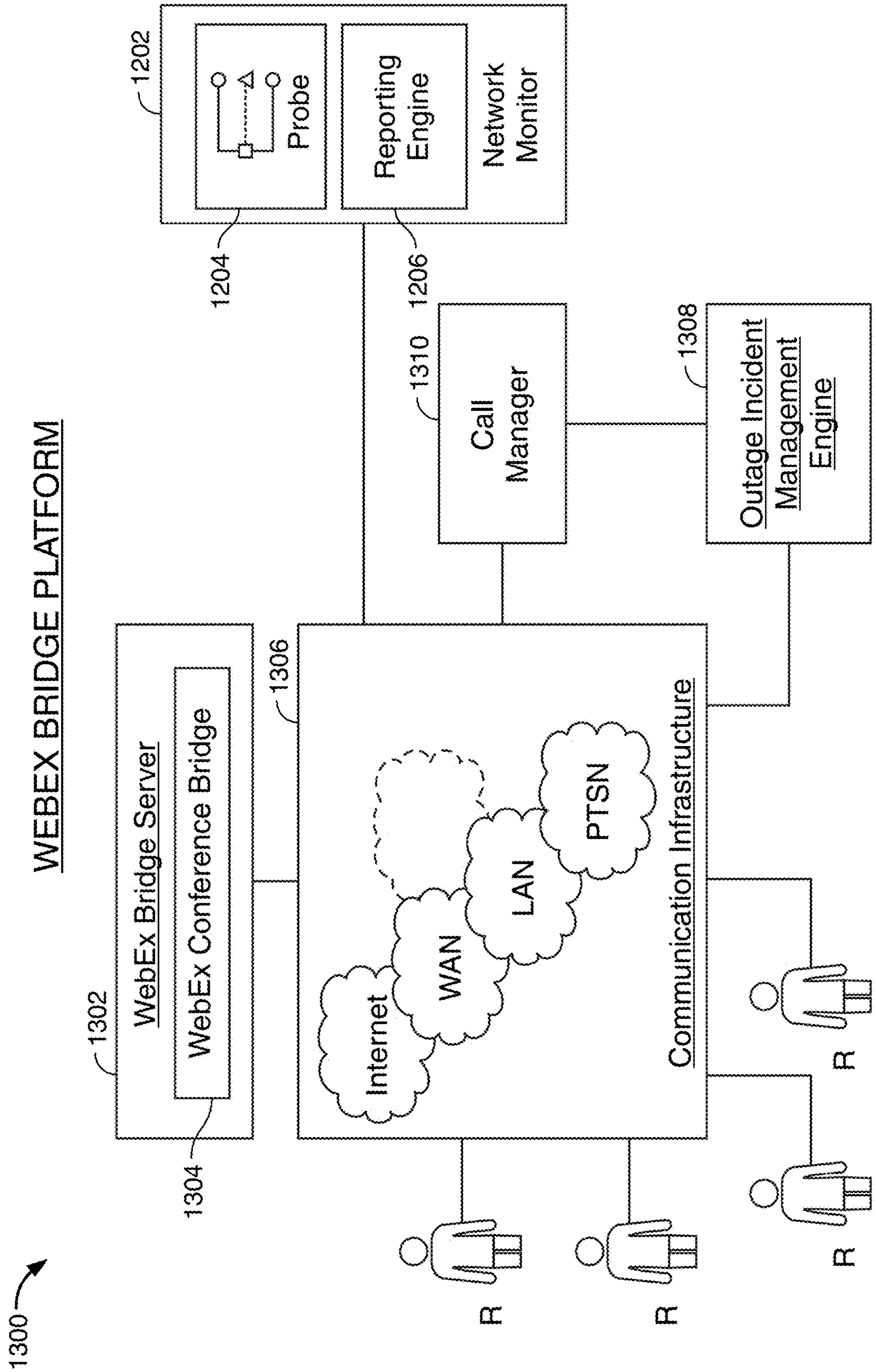
FIG. 13 shows illustrative apparatus, along with human participants, in accordance with the principles of the invention.

FIG. 13 shows illustrative WebEx bridge platform architecture 1300. Architecture 1300 may include WebEx bridge server 1302. Server 1302 may support one or more conference bridges, such as conference bridge 1304, that may be instantiated over network N. Architecture 1300 may include communication infrastructure 1306, which may include one or more networks, including, excluding or overlapping with network N. Architecture 1300 may include one or more human responders R, one or more of which may be engaged with a preexisting bridge. Architecture 1300 may include outage incident management engine 1308. Architecture 1300 may include WebEx call manager 1310. Architecture 1300 may include network monitor 1202.

Outage incident management engine 1308 may be in regular or scheduled communication with network monitor 1202. Network monitor 1202 may provide to outage incident management engine 1308 service level information based on the performance of nodes in network N.

Outage incident management engine 1308 may provide network topology for network N to network monitor 1202. Network monitor 1202 may provide network topology for network N to network monitor 1202. The topology may be layered. The topology may include an application layer, a network layer, a physical layer and any other suitable OSI layer or other type of layer. The topology may be coded to indicate levels of performance for different nodes in network N.

Outage incident management engine 1308 may map the topology to user information. The user information may include numbers of users, types of users and types and rates of activities that are associated with the nodes. The user information may include geography-based information. Outage incident management engine 1308 may combine information from network monitor 1202 with the user information to generate impact metrics that quantify impacts of the outage incidents.

Outage incident management engine 1308 may map the topology to asset information. The asset information may include numbers of employees, value of transactions, types of products, amounts of products and other suitable assets that are associated with the nodes. The asset information may include geography-based information. Outage incident management engine 1308 may combine information from network monitor 1202 with the asset information to generate impact metrics that quantify impacts of the outage incidents.

Outage incident management engine 1308 may perform triage on the nodes based on the service levels and metrics indicating the impact of the service levels on enterprise service. Some service levels may be deemed to be outage incidents. Outage incident management engine 1308 may identify a state in which the impact of a node on service exceeds a threshold impact. Outage incident management engine 1308 may deem such a node to be a subject of repair efforts. Outage incident management engine 1308 may deem nodes for which the impact does not exceed such a threshold to not be a subject of repair efforts. Each impact metric may have its own threshold impact.

Outage incident management engine 1308 may compare the impacts of different outages incidents and decide which outage incidents to analyze.

Outage incident management engine 1308 may perform root cause analysis ("RCA") or other forensic analysis on an outage incident to determine the cause of the outage incident. Outage incident management engine 1308 may propose a solution to the outage incident.

Figure 14:
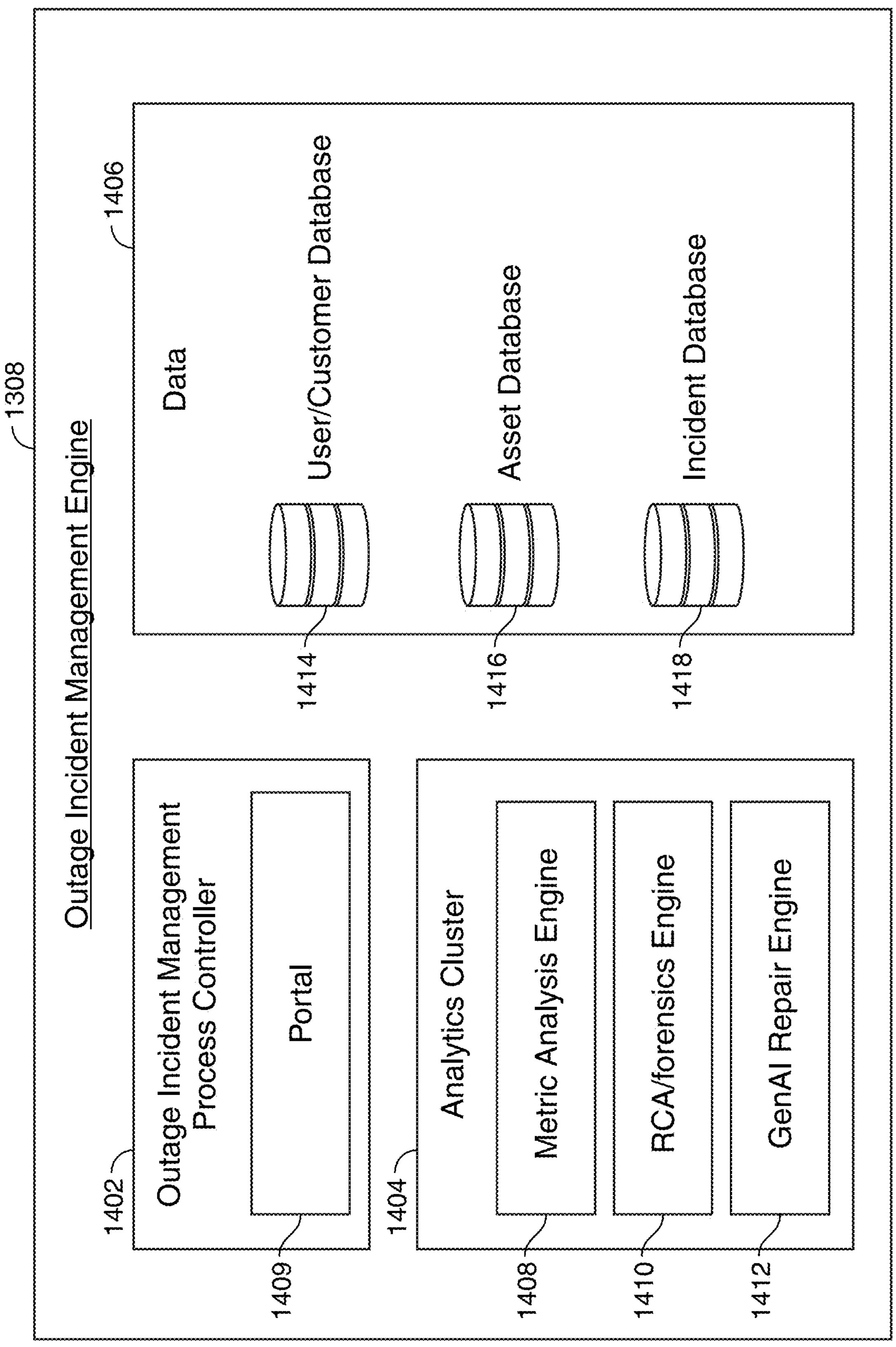
FIG. 14 shows illustrative apparatus in accordance with the principles of the invention.

FIG. 14 shows outage incident management engine 1308. Outage incident management engine 1308 may include outage incident management process controller 1402. Outage incident management engine 1308 may include analytics cluster 1404. Outage incident management engine 1308 may include data 1406.

Outage incident management process controller 1402 may allow an operator to schedule communications between outage incident management engine 1308 and network monitor 1202. Outage incident management process controller 1402 may govern the flow of processes within outage incident management engine 1308. Outage incident management processor 1402 may invoke metric analysis engine 1408 to perform impact metric analysis on service level data received from network monitor 1202. Metric analysis engine may retrieve from customer data from database 1414 customer data that is mapped to nodes identified with the service level data. Metric analysis engine may retrieve from asset database 1416 asset data that is mapped to nodes identified with the service level data. Metric analysis engine may determine whether impact metrics associated with the service level data indicate that a repair should be initiated.

Outage incident management process controller 1402 may include portal 1409. Portal 1409 may be accessed by one or more of responders R. Portal 1409 may be accessed by one or more of responders R via WebEx conference bridge 1304.

If a repair is indicated, outage incident management process controller 1402 may invoke RCA/forensics engine 1410 to perform a root cause analysis. RCA/forensics engine 1410 may include a genAI model that is trained on a database such as outage incident database 1418. Outage incident database 1418 may include historical reports from network monitor 1202 along with corresponding root causes determined in connection with those reports.

Outage incident management process controller 1402 may invoke genAI repair engine 1412 to propose a solution to an outage incident identified by metric analysis engine 1408. genAI repair engine 1412 may be trained on a database such as outage incident database 1418.

Outage incident management process controller 1308 may be configured to invoke a WebEx bridge such as 1304. Human responders R may participate in the bridge. Outage incident management process controller 1308 may participate in the bridge. Outage incident management process controller 1308 may provide to responders R updates of processes being performed by outage incident management engine 1308. Responders R may provide verbal feedback (not shown) to outage incident management engine 1308. The feedback may be incorporated into input for genAI repair engine 1412.

The feedback may be used to approve findings of metric analysis engine 1408. The feedback may be incorporated into input for RCA/forensics engine 1410. The feedback may be incorporated into input for genAI repair engine 1412.

Figure 15:
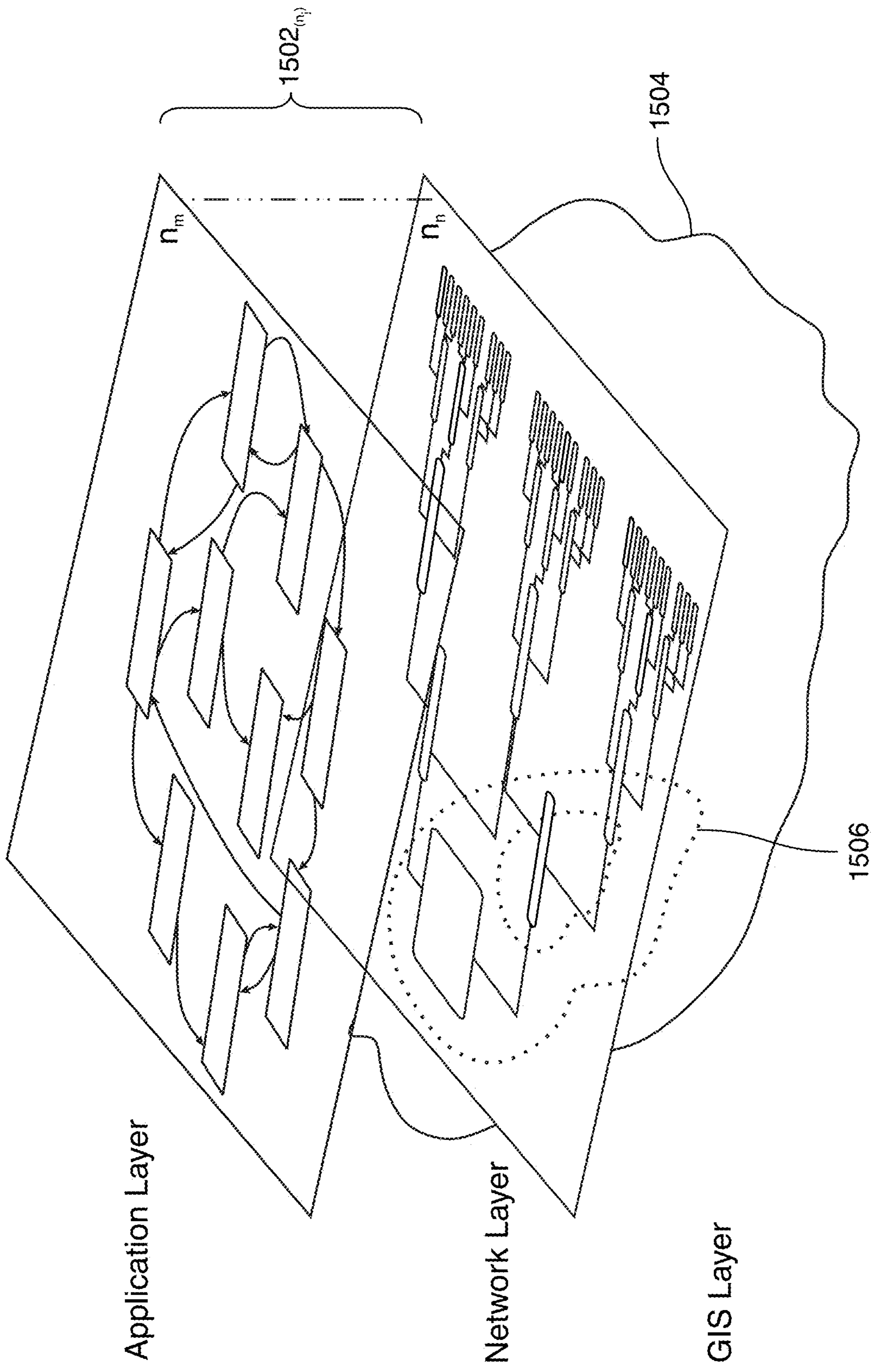
FIG. 15 shows illustrative information in accordance with the principles of the invention.

FIG. 15 shows illustrative network N topological map stack 1502. Nodes $n_j$ of network N may be mapped to GIS stack 1504 (one layer shown). GIS stack 1504 may show geographic asset distributions such as 1506 that may be represented in the form of a heat map.

Figure 16:
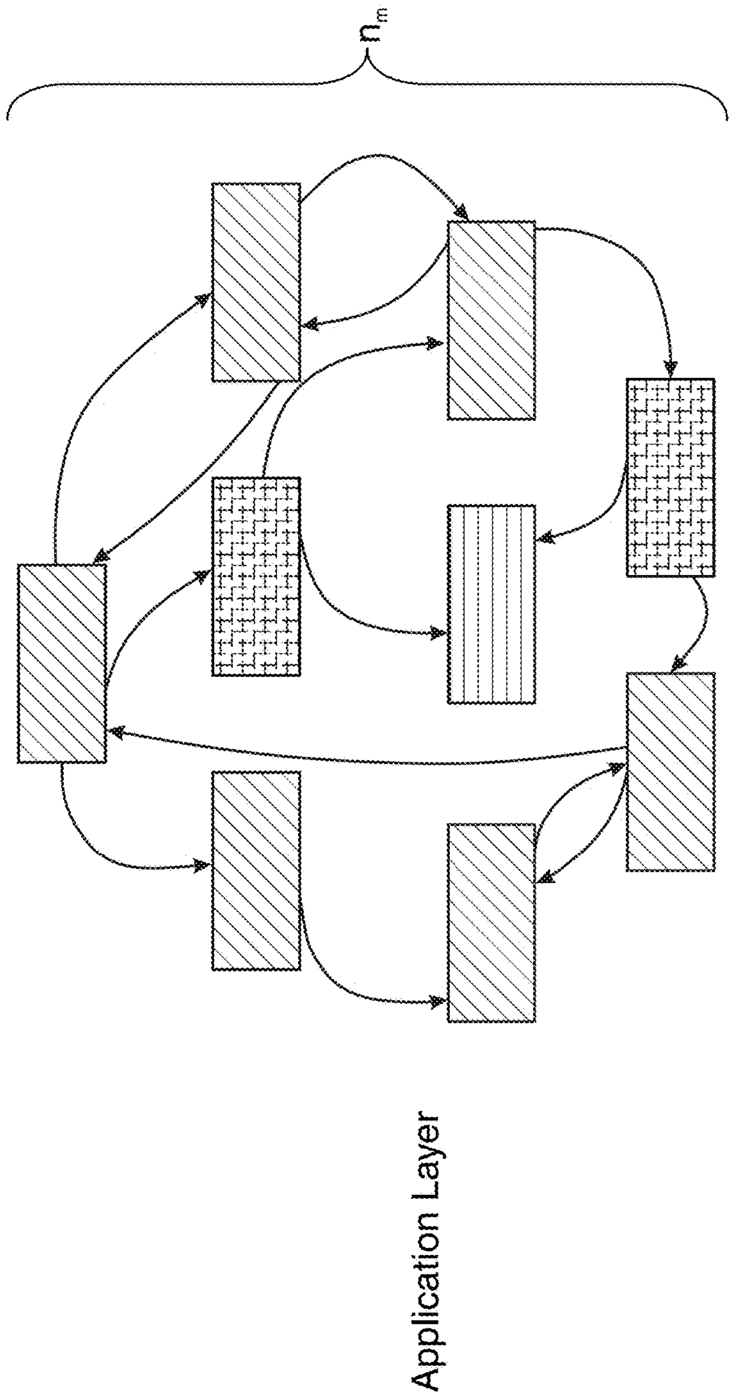
FIG. 16 shows illustrative information in accordance with the principles of the invention.

FIG. 16 shows illustrative nodes $n_j$ of the application layer map of stack 1502. The nodes may be coded to indicate a service level. Network monitor 1202 may determine the service level. Outage incident management engine 1305 may assign a status to the service level. The status may be based on impact metrics.

Figure 17:
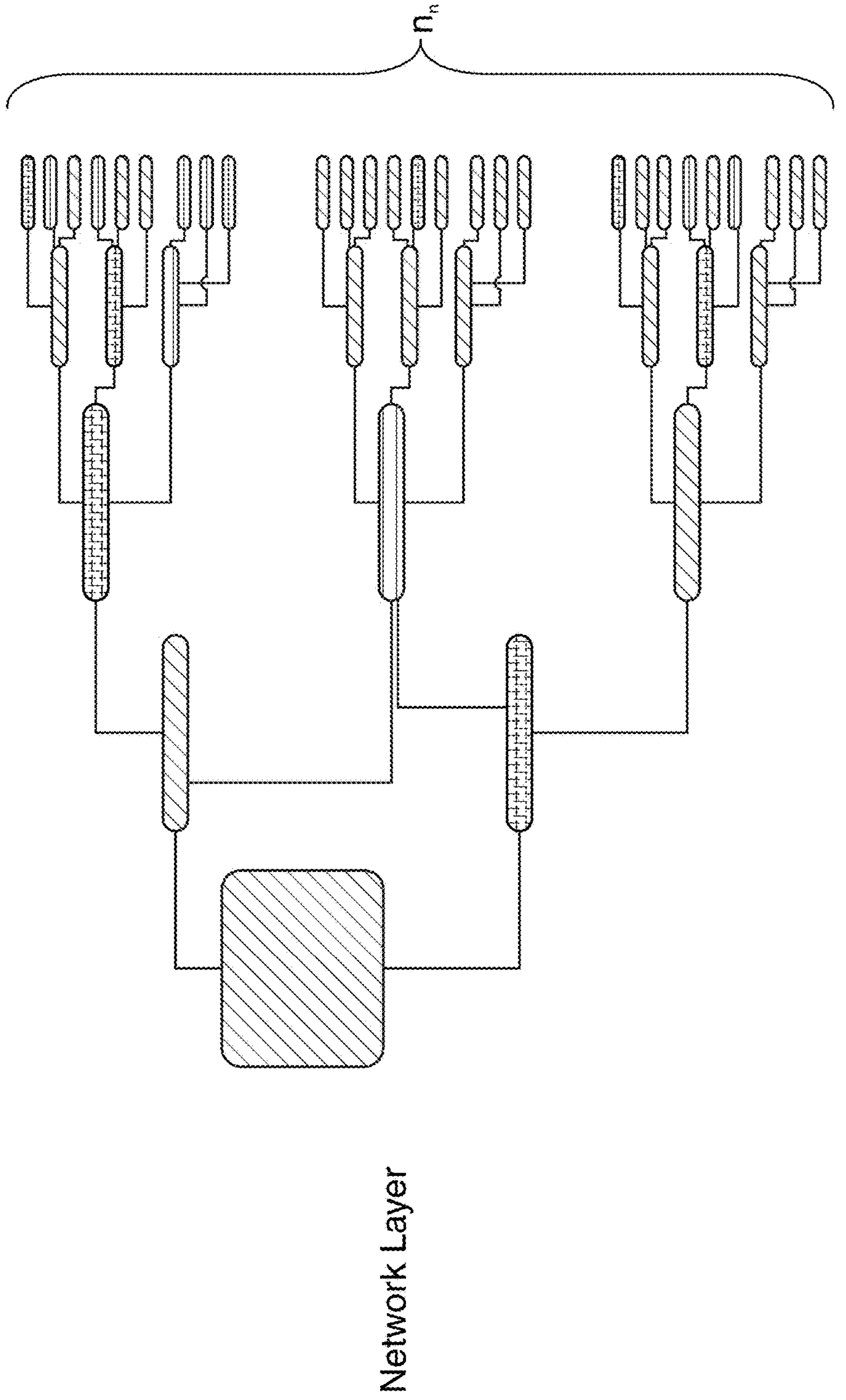
FIG. 17 shows illustrative information in accordance with the principles of the invention.

FIG. 17 shows illustrative nodes $n_j$ of the network layer map of stack 1502. The nodes may be coded to indicate a service level. Network monitor 1202 may determine the service level. Outage incident management engine 1305 may assign a status to the service level. The status may be based on impact metrics.

Figure 18:
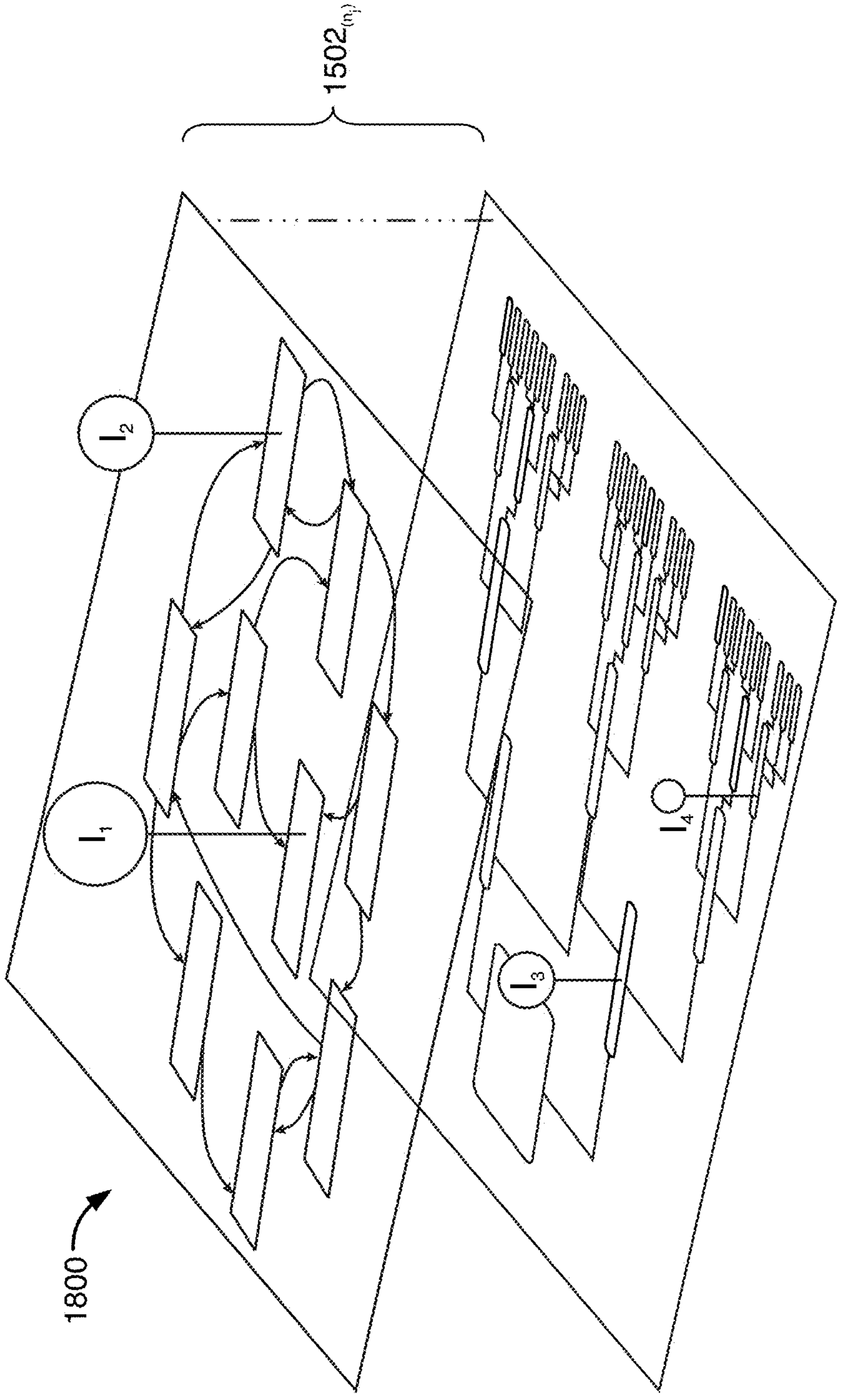
FIG. 18 shows illustrative information in accordance with the principles of the invention.

FIG. 18 shows illustrative view 1800 that may be produced by metric analysis engine 1408. View 1800 shows stack 1502. View 1800 may include pins such as $I_k$, which may correspond to metrics derived from GIS by metric analysis engine 1408. $I_k$ may be any suitable metric, for example, number of customers serviced by ATMs that depend on the nodes $n_j$ in which the pin is shown. Pin head diameter may be proportional to the metric.

Figure 19:
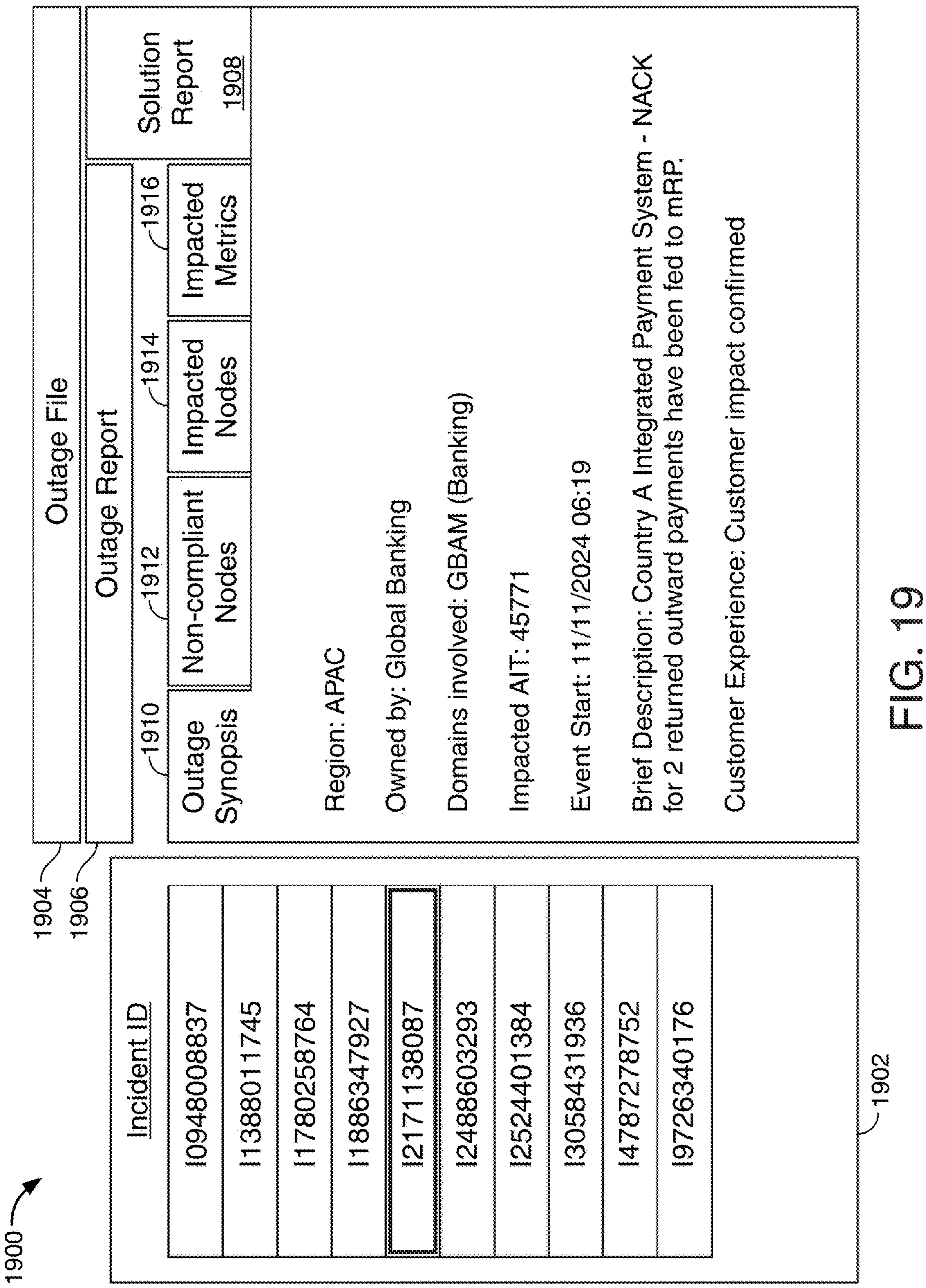
FIG. 19 shows illustrative information in accordance with the principles of the invention.

FIG. 19 shows illustrative view 1900 that may be viewed via portal 1409. The information shown in view 1900 may be generated or processed by one or both of network monitor 1202 and outage incident management engine 1308 in connection with processes shown and described herein.

View 1900 may include incident ID pane 1902. Incident ID pane 1902 may list historical and current network incidents, a record of each may be stored in incident database 1418. One or more of the incidents may be outage incidents. Illustrative outage incident I2171138087 is highlighted. This indicates that the data in outage file 1904 correspond to incident I2171138087.

Outage file 1904 may include outage report 1906. Outage file 1904 may include solution report 1908. Outage report 1906 may include information from network monitor 1202.

Outage report 1906 may include information from outage incident management engine 1308. Outage report 1906 may include tab 1910 for synoptic information about incident I2171138087. Outage report 1906 may include tab 1912 for a listing non-compliant nodes. Outage report 1906 may include tab 1914 for a listing of impacted nodes. Impacted nodes may be nodes that are compliant, but cannot provide service because of their dependency on non-compliant nodes. Outage report 1906 may include tab 1914 for a listing of impact metrics.

Figure 20:
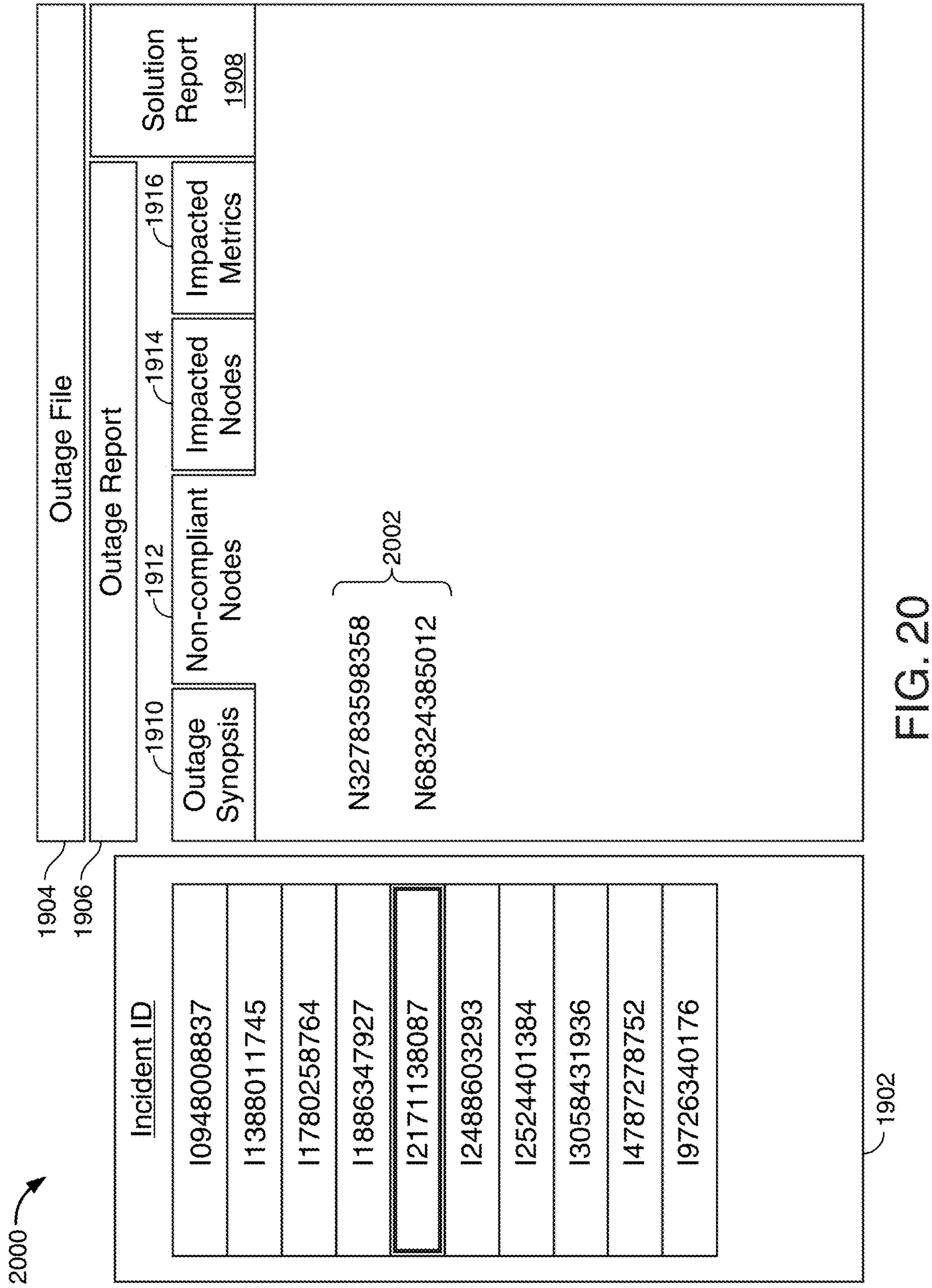
FIG. 20 shows illustrative information in accordance with the principles of the invention.

FIG. 20 shows illustrative view 2000 that may be viewed via portal 1409. The information shown in view 2000 may be generated or processed by one or both of network monitor 1202 and outage incident management engine 1308 in connection with processes shown and described herein. View 2000 shows listing 2002 of non-compliant nodes. The non-compliant nodes may be included in the $n_j$ nodes of stack 1502.

Figure 21:
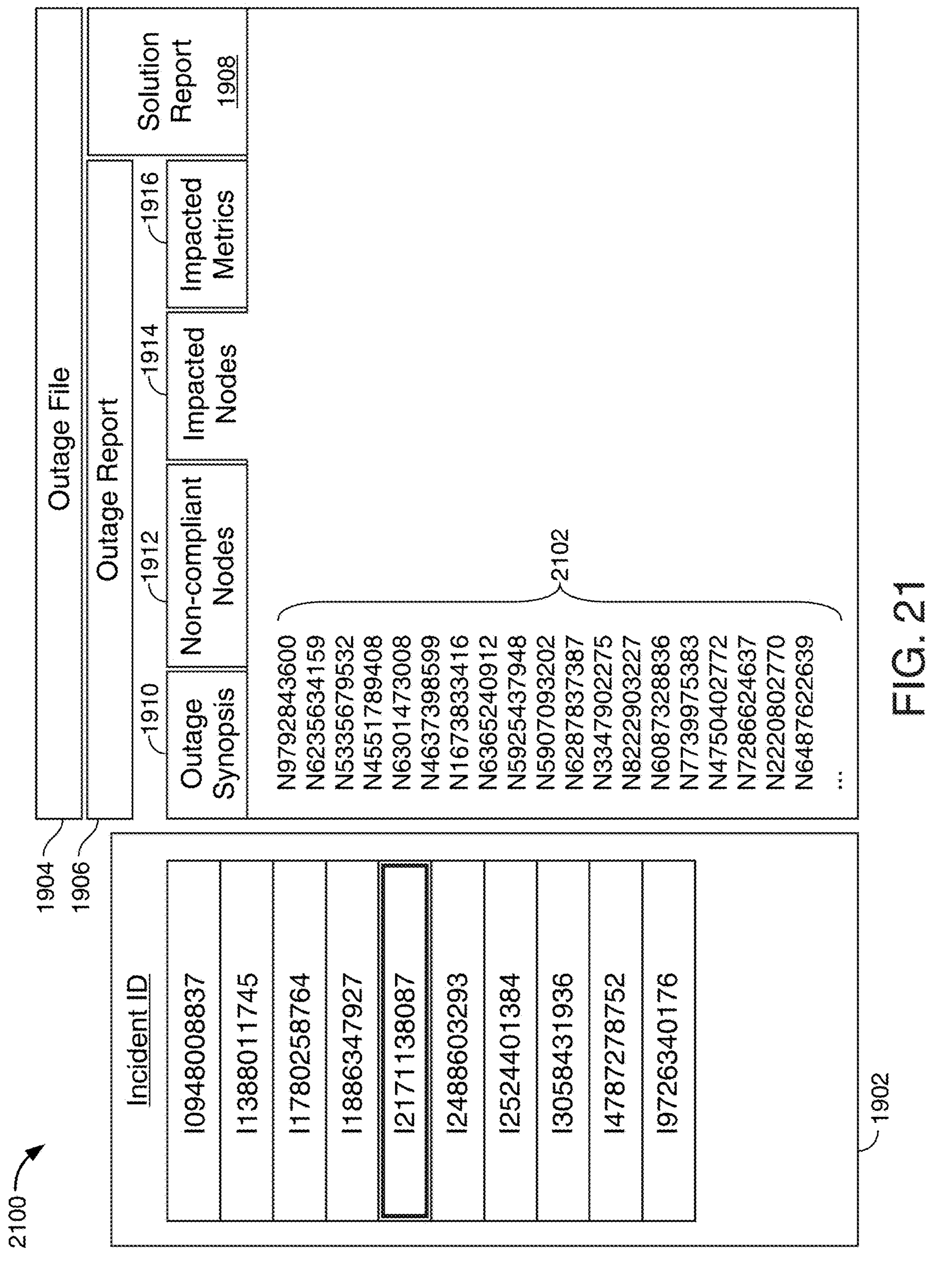
FIG. 21 shows illustrative information in accordance with the principles of the invention.

FIG. 21 shows illustrative view 2100 that may be viewed via portal 1409. The information shown in view 2100 may be generated or processed by one or both of network monitor 1202 and outage incident management engine 1308 in connection with processes shown and described herein. View 2100 shows listing 2102 of impacted nodes. The impacted nodes may be included in the $n_j$ nodes of stack 1502.

Figure 22:
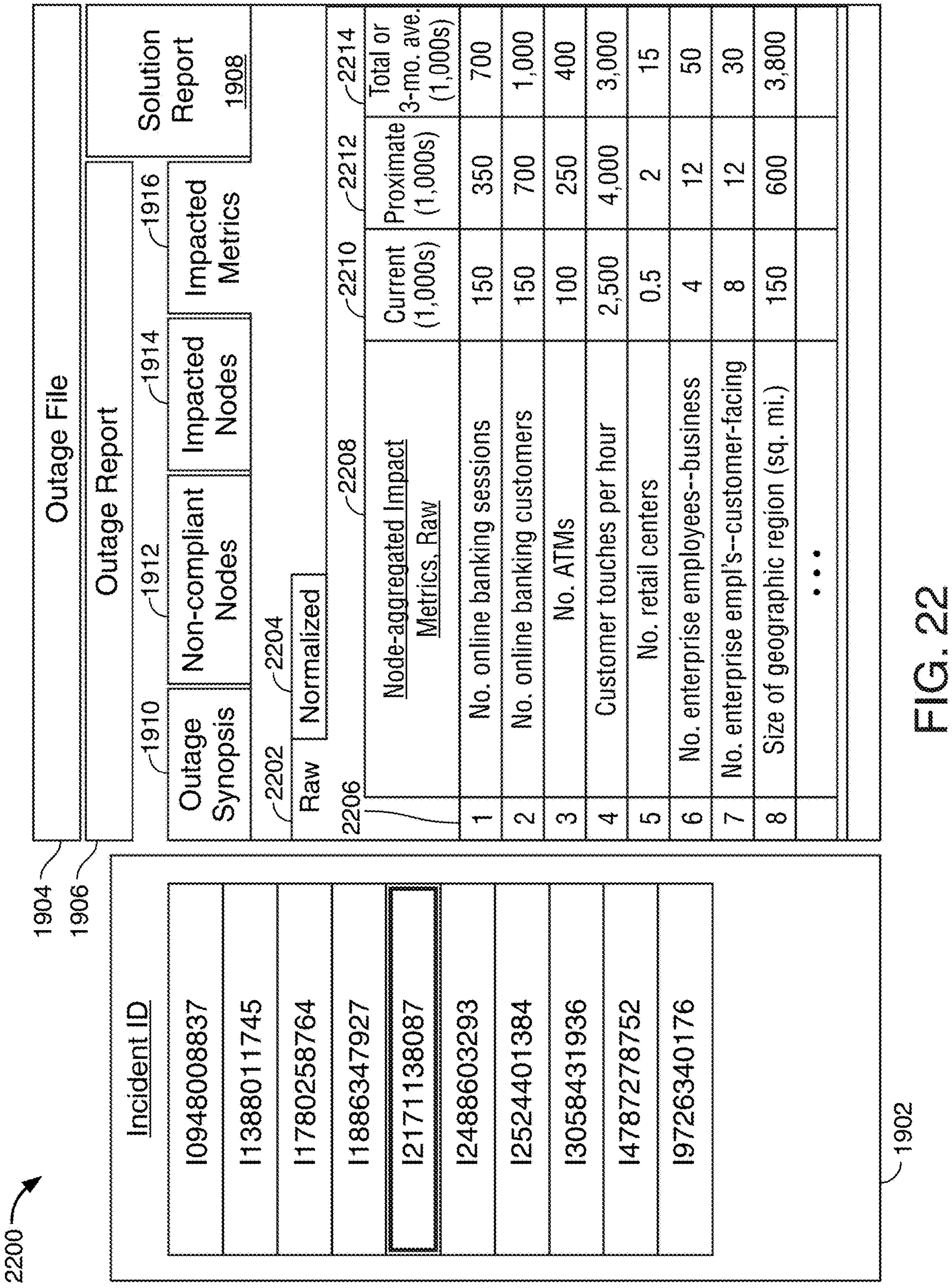
FIG. 22 shows illustrative information in accordance with the principles of the invention.

FIG. 22 shows illustrative view 2200 that may be viewed via portal 1409. The information shown in view 2200 may be generated or processed by one or both of network monitor 1202 and outage incident management engine 1308 in connection with processes shown and described herein. View 2200 shows that impact metrics tab 1916 may include sub-tab 2202 for raw metric data. Raw metric data may be as-measured. View 2200 shows that impact metrics tab 1916 may include sub-tab 2204 for normalized metric data. Normalized metric data may be normalized against any suitable reference data.

View 2200 may show index numbers 2206. View 2200 may identify for each index number a node-aggregated metric 2208. A node-aggregated metric may be a metric that corresponds to impact that is attributable to all non-compliant nodes. A node-aggregated metric may be a metric that corresponds to impact that is attributable to all impacted nodes. A node-aggregated metric may be a metric that corresponds to impact that is attributable to all nodes, including both non-compliant and impacted nodes. Metric analysis engine 1408 may remove from the metric evaluation impact that is attributable to more than one of the non-compliant and impacted nodes to avoid double-counting.

View 2200 may show for each of the metrics thousands of currently impacted items 2210. View 2200 may show for each of the metrics thousands of proximate items 2212. Proximate items 2212 may be in a zone of impact, even though not currently impacted. View 2200 may show, in thousands, for each of the metrics a total number of items in network N or a three-month average 2214, which may be relevant to items such as customer touches per hour. A customer touch may be a customer activity that causes information to be transmitted in network N, such as a mouse-click on an online banking portal or a card swipe at a point-of-sale device.

Figure 23:
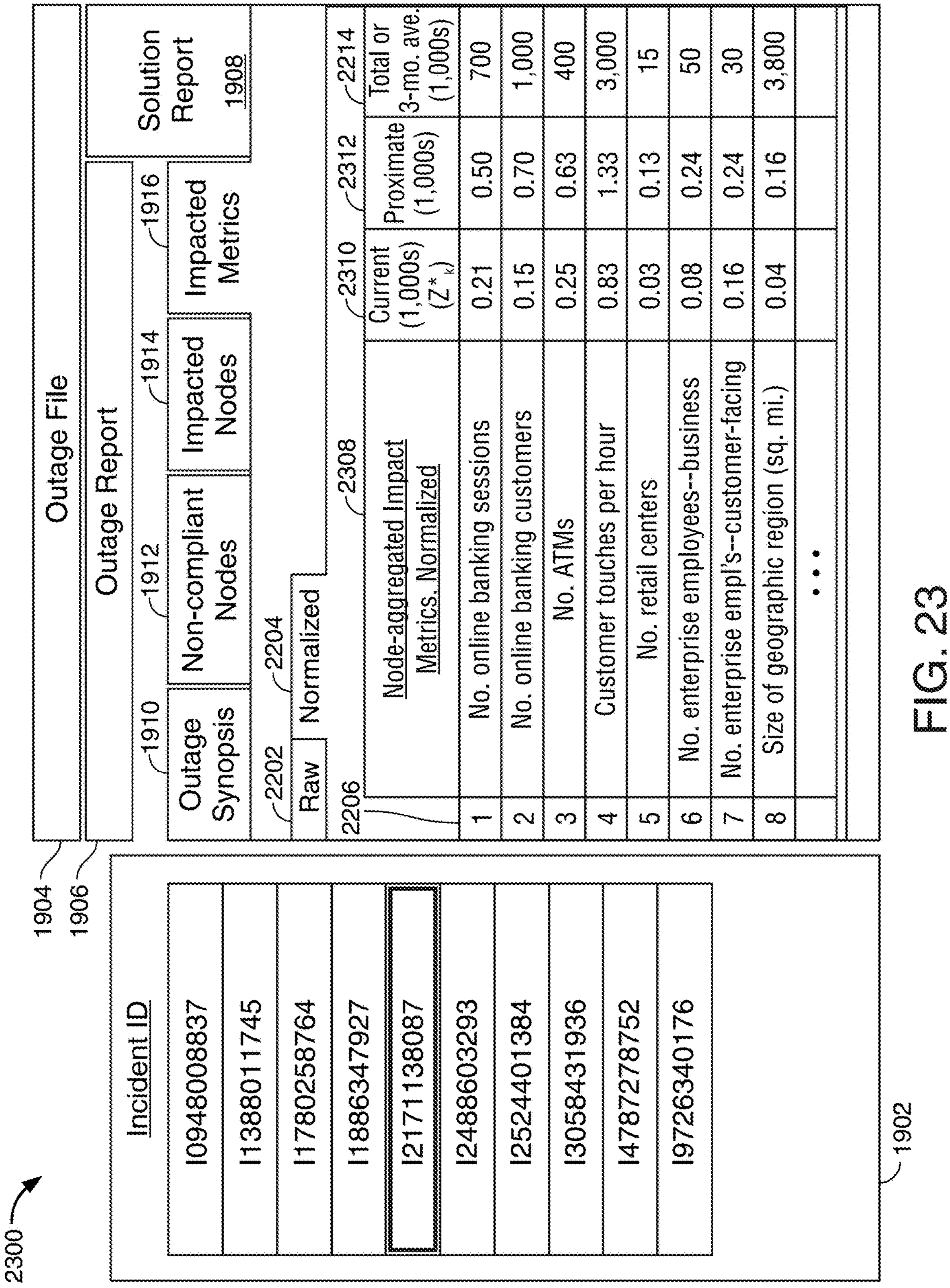
FIG. 23 shows illustrative information in accordance with the principles of the invention.

FIG. 23 shows illustrative view 2300 that may be viewed via portal 1409. The information shown in view 2300 may be generated or processed by one or both of network monitor 1202 and outage incident management engine 1308 in connection with processes shown and described herein.

View 2300 may identify for each index number a node-aggregated normalized metric 2308. Node-aggregated metrics may be metrics from view 2200 that are divided by a reference value. The reference number may be the value 2214 shown in view 2200.

View 2300 may show for each of the metrics a normalized value of currently impacted items 2310 ($Z_k$*). View 2200 may show for each of the metrics a normalized value of proximate items 2312.

Figure 24:
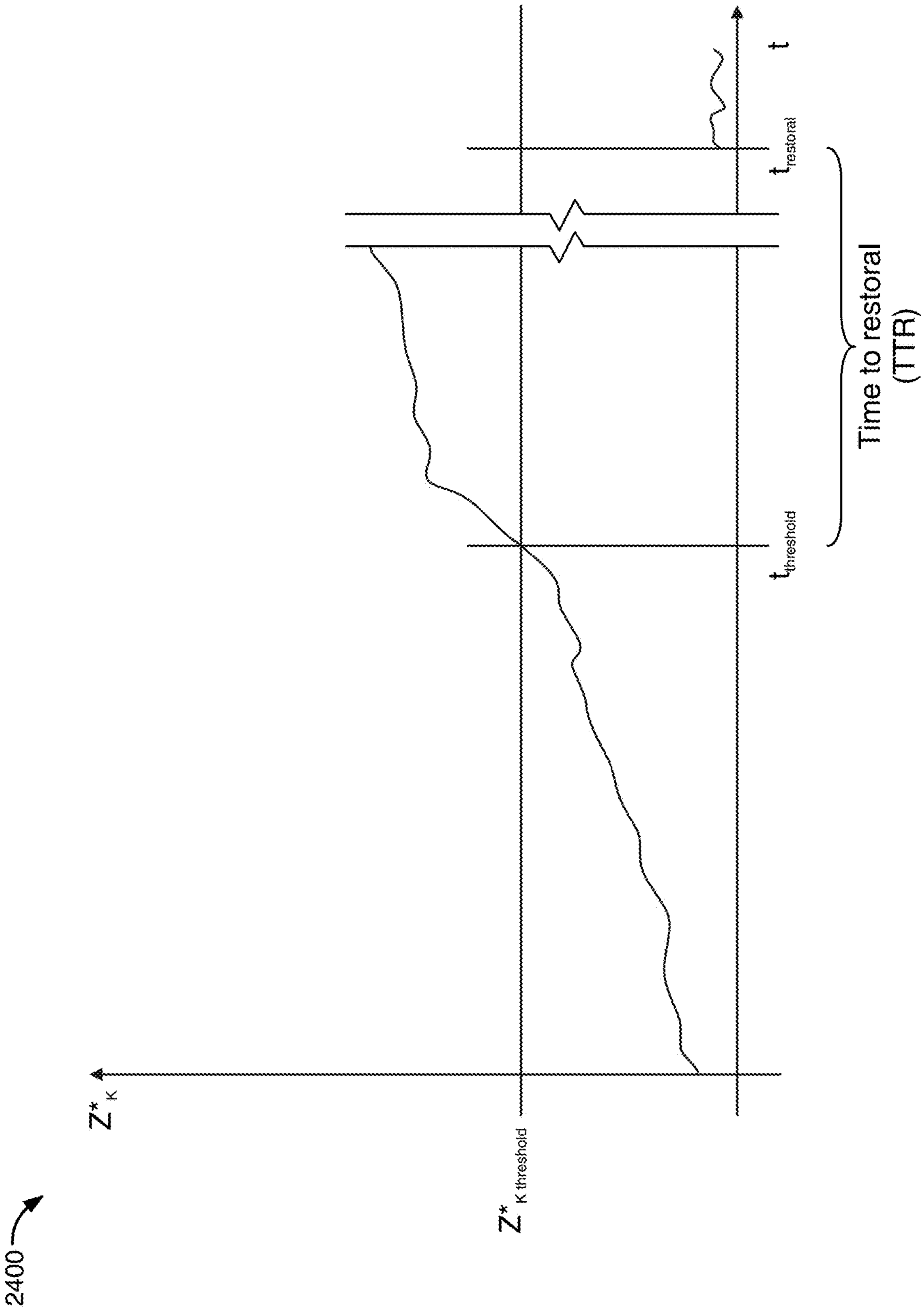
FIG. 24 shows illustrative information in accordance with the principles of the invention.

FIG. 24 shows illustrative view 2400. View 2400 shows Zk* (2310), for an arbitrary k, over time, t. At first, $Z_k$* may be below threshold $Z^*_{k,threshold}$. As an incident progresses in time, $Z_k$* may exceed $Z^*_{k,threshold}$. At that time, metric analysis engine 1408 may change the status of the incident to an outage and may initiate root cause analysis and genAI repair processes. After the genAI repair process is complete, network N may be restored to compliant functioning and $Z_k$* may have been brought down below $Z^*_{k,threshold}$. Time to restoral ("TTR") is shown on the t axis. Mean time to restoral ("MTTR") may be defined as an average TTR taken over all outage incidents in a time period, such as a week, a month, a quarter, a year, or any suitable number of years or over any other suitable time period.

Figure 25:
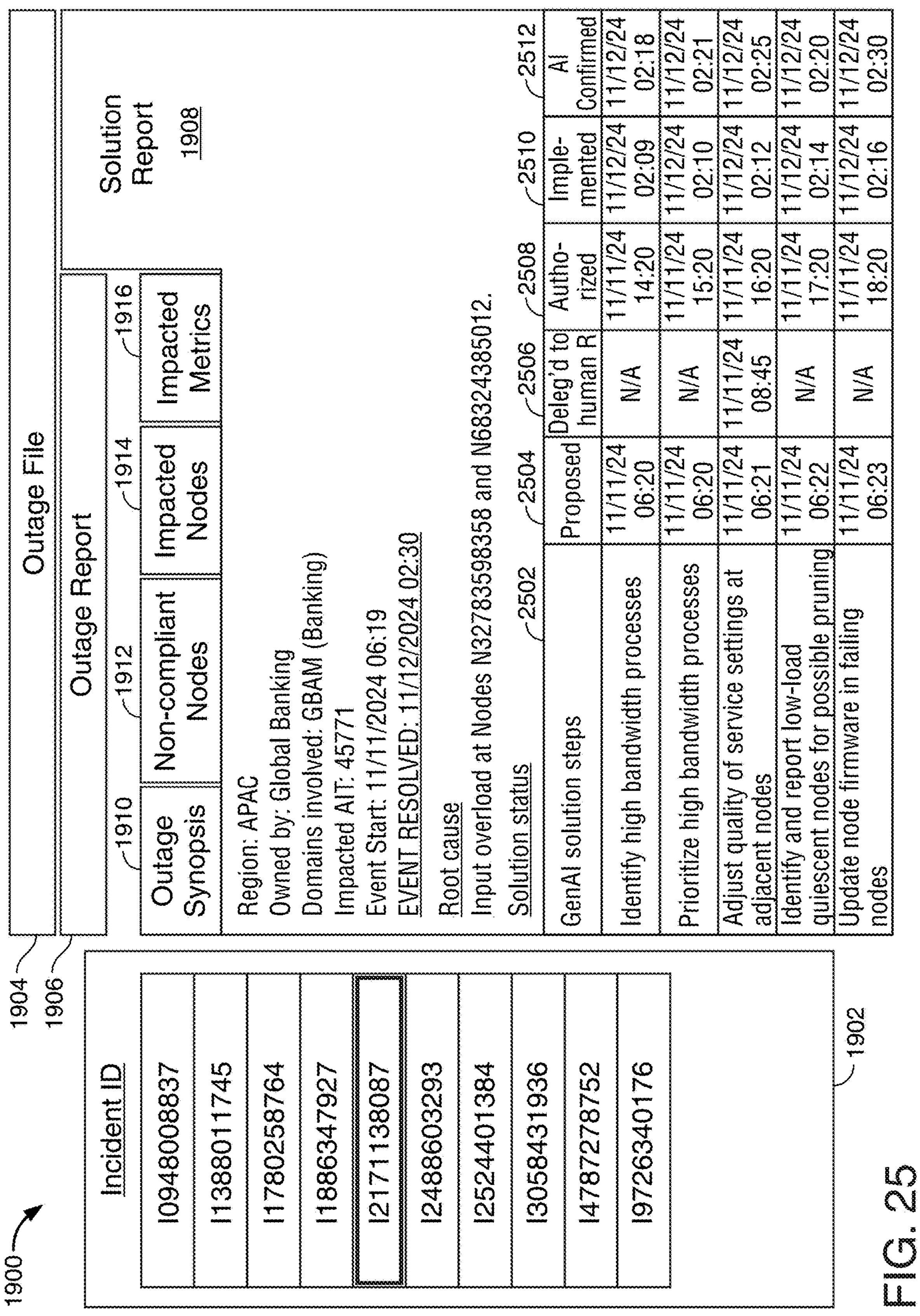
FIG. 25 shows illustrative information in accordance with the principles of the invention.

FIG. 25 shows illustrative view 2500 that may be viewed via portal 1409. The information shown in view 2500 may be generated or processed by one or both of network monitor 1202 and outage incident management engine 1308 in connection with processes shown and described herein.

Solution report 1906 may list synoptic information about incident I2171138087. Solution report 1906 may list root cause information about incident I2171138087. Solution report 1906 may list proposed solution steps 2502 for incident I2171138087. Solution report 1906 may list dates 2504 on which genAI repair engine 1412 proposed each solution step. Solution report 1906 may list dates 2506 on which outage incident management process controller 1402 delegated, if applicable (otherwise, "N/A"), a solution step to a human responder R. Human responders R may have authority to compel delegation of a solution step via WebEx conference bridge 1304. Solution report 1906 may list dates 2508 on which a responder R authorized the proposed solution step. genAI repair engine 1412 may be operated in a mode in which authorization is not required. Solution report 1906 may list dates 2510 on which genAI repair engine 1412 implemented the solution steps. Solution report 1906 may list dates 2510 on which genAI repair engine 1412 confirmed that the solution steps were performed. When all confirmation is completed, outage incident management process controller may provide a resolution report to one or more of responders R. The resolution report may have some or all of the information that is included in view 2500.

Figure 26:
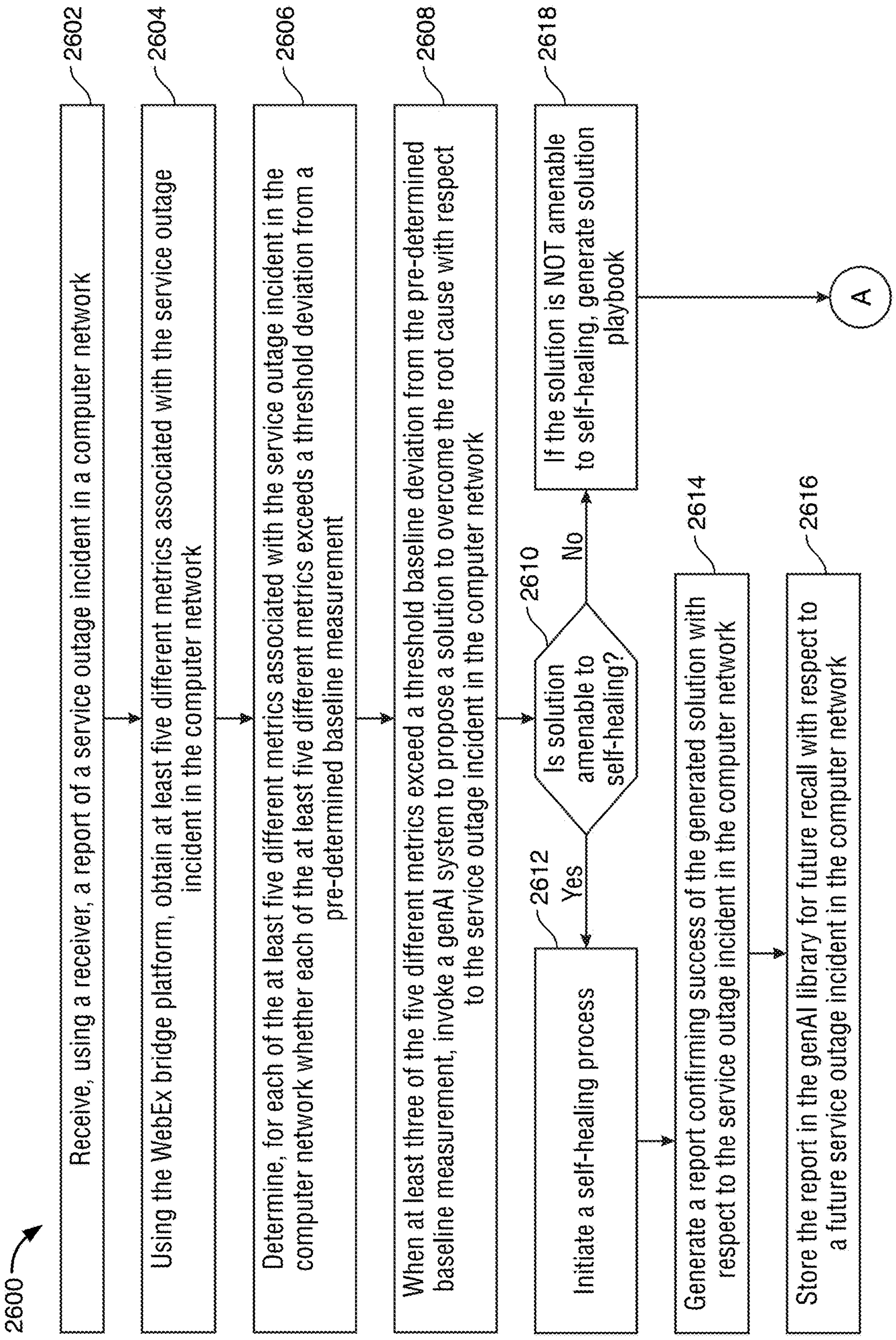
FIG. 26 shows illustrative steps of a process in accordance with the principles of the invention.
Figure 26:
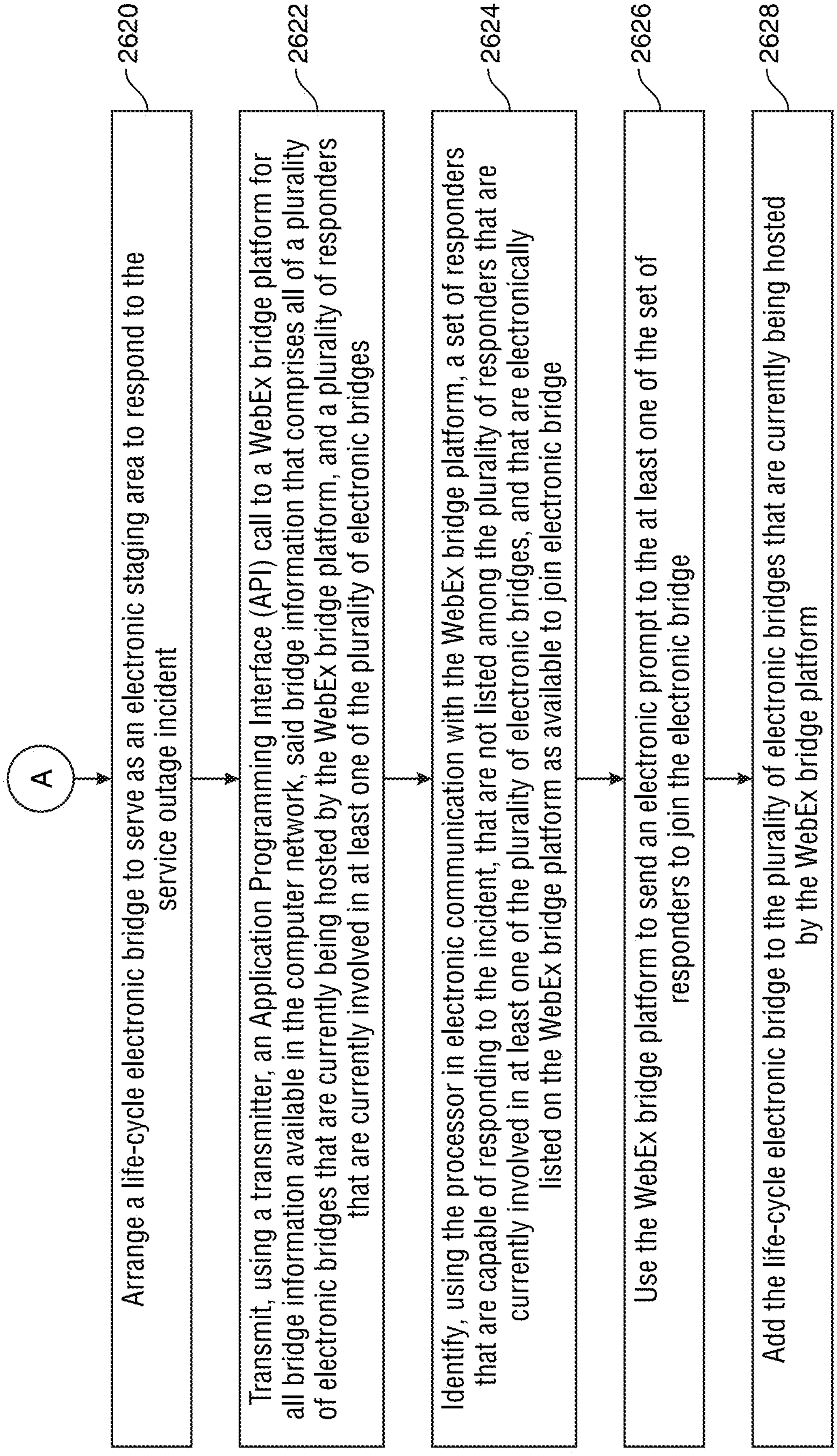

FIG. 26 shows illustrative steps of process 2600 for reducing a mean time to restoral ("MTTR") for a set of computing devices in a network. Process 2600 may begin at step 2602.

At step 2602, the system may receive, using a receiver, a report of a service outage incident in a computer network.

At step 2604, the system may, using the WebEx bridge platform, obtain at least five different metrics associated with the service outage incident in the computer network.

At step 2606, the system may determine, for each of the at least five different metrics associated with the service outage incident in the computer network whether each of the at least five different metrics exceeds a threshold deviation from a pre-determined baseline measurement.

At step 2608, the system may when at least three of the five different metrics exceed a threshold baseline deviation from the pre-determined baseline measurement, invoke a genAI system to propose a solution to overcome the root cause with respect to the service outage incident in the computer network.

At step 2610, the system may determine whether a solution is amenable to self-healing. If at step 2610 the solution is amenable to self-healing, the system may continue at step 2612.

At step 2612, the system may initiate a self-healing process.

At step 2614, the system may generate a report confirming success of the generated solution with respect to the service outage incident in the computer network.

At step 2616, the system may store the report in the genAI library for future recall with respect to a future service outage incident in the computer network.

If at step 2620, a solution is not amenable to self-healing, process 2600 may continue at step 2618. At step 2618, the system may if the solution is not amenable to self-healing, generate solution "playbook" that includes proposed solution steps. The system may delegate steps in the playbook to a human responder R.

At step 2620, the system may arrange a life-cycle electronic bridge to serve as an electronic staging area to respond to the service outage incident.

At step 2622, the system may transmit, using a transmitter, an application programming interface (API) call to a WebEx bridge platform for all bridge information available in the computer network, said bridge information that comprises all of a plurality of electronic bridges that are currently being hosted by the WebEx bridge platform, and a plurality of responders that are currently involved in at least one of the plurality of electronic bridges.

At step 2624, the system may identify, using the processor in electronic communication with the WebEx bridge platform, a set of responders that are capable of responding to the incident, that are not listed among the plurality of responders that are currently involved in at least one of the plurality of electronic bridges, and that are electronically listed on the WebEx bridge platform as available to join electronic bridge.

At step 2626, the system may use the WebEx bridge platform to send an electronic prompt to the at least one of the set of responders to join the electronic bridge.

At step 2628, the system may add the life-cycle electronic bridge to the plurality of electronic bridges that are currently being hosted by the WebEx bridge platform.

Thus, methods and apparatus for virtual monitoring of a set of computing devices, and reducing a mean time to restoral ("MTTR") for the set of computing devices are provided. Persons skilled in the art will appreciate that the present invention can be practiced by other than the described embodiments, which are presented for purposes of illustration rather than of limitation, and that the present invention is limited only by the claims that follow.

What is claimed is:

1. One or more non-transitory computer-readable media storing computer-executable instructions which, when executed by a processor on a computer system, provide a process for virtual monitoring of a set of computing devices, and reduce a mean time to restoral ("MTTR") for the set of computing devices, the process comprising:

receiving, using a receiver, a report of a service outage incident in a computer network;

arranging a life-cycle electronic bridge to serve as an electronic staging area to respond to the service outage incident;

transmitting, using a transmitter, an Application Programming Interface (API) call to a WebEx bridge platform for all bridge information available in the computer network, said bridge information that comprises all of a plurality of electronic bridges that are currently being hosted by the WebEx bridge platform, and a plurality of responders that are currently involved in at least one of the plurality of electronic bridges;

identifying, using the processor in electronic communication with the WebEx bridge platform, a set of responders that are capable of responding to the incident, that are not listed among the plurality of responders that are currently involved in at least one of the plurality of electronic bridges, and that are electronically listed on the WebEx bridge platform as available to join electronic bridge;

using the WebEx bridge platform to send an electronic prompt to the at least one of the set of responders to join the electronic bridge;

adding the life-cycle electronic bridge to the plurality of electronic bridges that are currently being hosted by the WebEx bridge platform;

using the WebEx bridge platform to determine a root cause for each report of service outage incident in the computer network;

for each outage incident:

using the WebEx bridge platform to obtain at least five different metrics associated with the service outage incident in the computer network; and determining, for each of the at least five different metrics associated with the service outage incident in the computer network whether each of the at least five different metrics exceeds a threshold deviation from a pre-determined baseline measurement;

when at least three of the five different metrics exceeds a threshold baseline deviation from the pre-determined baseline measurement, invoking a genAI system to generate a solution to self-heal the root cause with respect to the service outage incident in the computer network;

receiving a report confirming success of the generated solution with respect to the service outage incident in the computer network; and storing the report in a database for future recall with respect to a future service outage incident in the computer network.

2. The process of claim 1, wherein the genAI system comprises a database, said database for storing information derived from the electronic bridge.

3. The process of claim 1, wherein the genAI system comprises a database, said database for storing information derived from a set of legacy electronic bridges.

4. The process of claim 1 wherein the report includes node identifiers corresponding to non-compliant nodes.

5. The process of claim 1 wherein the report includes node identifiers corresponding to impacted nodes, each impacted node performing as a minimally-compliant node.

6. The process of claim 4 wherein:

at least one of the non-compliant nodes is defined within a first OSI layer; and at least one of the non-compliant nodes is defined within a second OSI layer that is different from the first OSI layer.

7. The process of claim 5 wherein:

at least one of the minimally-compliant nodes is defined within a first OSI layer; and at least one of the minimally-compliant nodes is defined within a second OSI layer that is different from the first OSI layer.

8. A method for restoring network service, the method comprising:

receiving, using a receiver, a report of a service outage incident in a computer network;

arranging a life-cycle electronic bridge to serve as an electronic staging area to respond to the service outage incident;

transmitting, using a transmitter, an Application Programming Interface (API) call to a WebEx bridge platform for all bridge information available in the computer network, said bridge information that comprises all of a plurality of electronic bridges that are currently being hosted by the WebEx bridge platform, and a plurality of responders that are currently involved in at least one of the plurality of electronic bridges;

identifying, using a processor in electronic communication with the WebEx bridge platform, a set of responders that are capable of responding to the incident, that are not listed among the plurality of responders that are currently involved in at least one of the plurality of electronic bridges, and that are electronically listed on the WebEx bridge platform as available to join electronic bridge;

using the WebEx bridge platform to send an electronic prompt to the at least one of the set of responders to join the electronic bridge;

adding the life-cycle electronic bridge to the plurality of electronic bridges that are currently being hosted by the WebEx bridge platform;

using the WebEx bridge platform to determine a root cause for each report of service outage incident in the computer network;

for each outage incident:

using the WebEx bridge platform to obtain at least five different metrics associated with the service outage incident in the computer network; and determining, for each of the at least five different metrics associated with the service outage incident in the computer network whether each of the at least five different metrics exceeds a threshold deviation from a pre-determined baseline measurement;

when at least three of the five different metrics exceeds a threshold baseline deviation from the pre-determined baseline measurement, invoking a genAI system to generate a solution to self-heal the root cause with respect to the service outage incident in the computer network;

receiving a report confirming success of the generated solution with respect to the service outage incident in the computer network; and storing the report in a database for future recall with respect to a future service outage incident in the computer network.

9. The method of claim 8 wherein the genAI root cause model includes a transformer model.

10. The method of claim 8 wherein the genAI network repair model includes a transformer model.

11. The method of claim 8 further comprising, in response to receiving the report, transmitting, using a WebEx call manager, an incident alert to responders.

12. The method of claim 11 wherein the incident alert states that an impact triage process is pending.

13. The method of claim 11 wherein the incident alert states that a machine-based network repair solution is pending.

14. The method of claim 8 wherein the report includes node identifiers corresponding to non-compliant nodes.

15. The method of claim 8 wherein the report includes node identifiers corresponding to impacted nodes, each impacted node performing at no more than a minimally compliant level.

16. A system for restoring service in a communication network, the system comprising one or more non-transitory computer-readable media storing computer-executable instructions which, when executed by a processor on a computer system, the system comprising:

a WebEx call manager that is configured to receive a report of a service outage incident in a computer network;

a WebEx conference bridge server that is:

hosted by a WebEx conference bridge platform; and is configured to:

arrange a life-cycle electronic bridge to serve as an electronic staging area to respond to the service outage incident; and collect all bridge information available regarding the computer network, said bridge information that comprises all of a plurality of electronic bridges that are currently being hosted by the WebEx bridge platform, and a plurality of responders that are currently involved in at least one of the plurality of electronic bridges;

an outage management engine in electronic communication with the WebEx bridge platform that is configured to identify a set of responders that are capable of responding to the incident, that are not listed among the plurality of responders that are currently involved in at least one of the plurality of electronic bridges, and that are electronically listed on the WebEx conference bridge server as available to join electronic bridge;

wherein:

the WebEx conference bridge server is further configured to:

send an electronic prompt to the at least one of the set of responders to join the electronic bridge; and add the life-cycle electronic bridge to the plurality of electronic bridges that are currently being hosted by the WebEx bridge platform;

the outage management engine is further configured to:

determine a root cause for each report of service outage incident in the computer network;

for each service outage incident:

identify at least five different metrics associated with the service outage incident in the computer network;

determine, for each of the at least five different metrics associated with the service outage incident in the computer network whether each of the at least five different metrics exceeds a threshold deviation from a pre-determined baseline measurement;

when at least three of the five different metrics exceeds a threshold baseline deviation from the pre-determined baseline measurement, invoke a genAI system to generate a solution to self-heal the root cause with respect to the service outage incident in the computer network;

transmit to the responders a report confirming success of the generated solution with respect to the service outage incident in the network; and store the report in an outage incident database for future recall with respect to a future service outage incident in the network.

17. The system of claim 16 wherein the report includes an indication that an impact triage process is pending.

18. The system of claim 16 wherein the report includes an indication that a machine-based network repair solution is pending.

19. The system of claim 16 wherein the report includes node identifiers corresponding to non-compliant nodes in the network.

20. The system of claim 16 wherein the report includes node identifiers corresponding to impacted nodes in the network, each impacted node performing at no more than a minimally compliant level.

* * * * *